US011861964B2

(12) United States Patent
Tachibana et al.

(10) Patent No.: US 11,861,964 B2
(45) Date of Patent: Jan. 2, 2024

(54) VALUABLE MEDIUM HANDLING SYSTEM

(71) Applicant: Glory Ltd., Himeji (JP)

(72) Inventors: Yusaku Tachibana, Himeji (JP); Tsuyoshi Izumida, Himeji (JP)

(73) Assignee: GLORY LTD., Himeji (JP)

(*) Notice: Subject to any disclaimer, the term of this patent is extended or adjusted under 35 U.S.C. 154(b) by 376 days.

(21) Appl. No.: 17/199,448

(22) Filed: Mar. 12, 2021

(65) Prior Publication Data

US 2021/0295633 A1 Sep. 23, 2021

(30) Foreign Application Priority Data

Mar. 23, 2020 (JP) ................................ 2020-050775

(51) Int. Cl.

*G07D 11/30* (2019.01)
*G07D 11/235* (2019.01)
*G07D 11/12* (2019.01)
*G07D 11/18* (2019.01)
*G07D 11/50* (2019.01)

(52) U.S. Cl.

CPC ........... *G07D 11/135* (2019.01); *G07D 11/18* (2019.01); *G07D 11/235* (2019.01); *G07D 11/30* (2019.01); *G07D 11/50* (2019.01)

(58) Field of Classification Search

CPC .............................. G07D 11/235; G07D 11/30
See application file for complete search history.

(56) References Cited

U.S. PATENT DOCUMENTS

| | | | | |
|---|---|---|---|---|
| 5,105,364 | A * | 4/1992 | Kawamura | G07D 11/34 700/219 |
| 5,615,625 | A * | 4/1997 | Cassidy | G07D 11/12 232/15 |
| 6,976,634 | B2 | 12/2005 | Washington et al. | |
| 9,141,876 | B1 * | 9/2015 | Jones | G07D 11/30 |
| 2015/0364015 | A1 * | 12/2015 | Turocy | G07F 19/209 235/379 |
| 2019/0325718 | A1 * | 10/2019 | Couturier | G08B 13/08 |
| 2020/0092683 | A1 * | 3/2020 | Fyfe | H04L 67/125 |

FOREIGN PATENT DOCUMENTS

JP H0849470 A * 2/1996

* cited by examiner

*Primary Examiner* — Christle I Marshall
(74) *Attorney, Agent, or Firm* — XSENSUS LLP

(57) ABSTRACT

Operability of a valuable medium handling system is enhanced.

A valuable medium handling system 1 includes a communication device 3001 disposed at a storage cassette 31 that is detachably attached to a medium handling device 2 and that stores banknotes, and a controller 513 and a computer 5 that communicate with the communication device 3001 via a communication line 9. The controller 513 and the computer 5 each perform a predetermined process by communicating with the communication device 3001 via the communication line 9.

20 Claims, 17 Drawing Sheets

VALUABLE MEDIUM HANDLING SYSTEM

CROSS-REFERENCE TO RELATED APPLICATION

The disclosure of Japanese Patent Application No. 2020-050775, filed on Mar. 23, 2020, is incorporated herein by reference.

BACKGROUND

Field

The technique disclosed herein relates to a valuable medium handling system.

Description of the Background Art

U.S. Pat. No. 6,976,634 discloses a handling device for, for example, depositing money and dispensing money. The valuable medium handling device includes a storage unit for storing money. The storage unit includes a RFID tag. Information on, for example, money stored in the storage unit is stored in the RFID tag. The information stored in the RFID tag can be read by a RFID reader.

SUMMARY

However, according to U.S. Pat. No. 6,976,634, each RFID tag and the RFID reader need to be connected to each other in one-to-one correspondence. Information needs to be read one by one from a plurality of storage units by the RFID reader, and this is laborious. In the technique disclosed in U.S. Pat. No. 6,976,634, management of the plurality of storage units is difficult.

The technique disclosed herein enhances operability of a valuable medium handling system.

Specifically, the technique disclosed herein is directed to a valuable medium handling system. The valuable medium handling system includes a communication unit disposed at a storage unit that is detachably attached to a first medium handling device and that stores valuable mediums; and a controller configured to communicate with the communication unit via a communication network, The communication unit includes a first communication unit disposed at a first storage unit as the storage unit and a second communication unit disposed at a second storage unit as the storage unit. The controller performs a predetermined process by communicating with each of the first communication unit and the second communication unit via the communication network.

In this configuration, the controller can communicate with each storage unit via the communication network, thereby enhancing operability of the valuable medium handling system including a plurality of storage units.

The communication unit may transmit storage unit information related to the storage unit, via the communication network, and the controller may receive the storage unit information and perform a predetermined process based on the storage unit information.

Thus, the controller can receive the storage unit information from the storage unit, thereby enhancing operability of the valuable medium handling system.

The storage unit information may include at least one of individual identification information of the storage unit, state information related to a state of the storage unit, valuable medium information on the valuable mediums stored in the storage unit, positional information of the storage unit, and maintenance information related to the storage unit.

Thus, the controller can perform various processes for the storage unit based on the storage unit information, thereby enhancing operability of the valuable medium handling system.

The storage unit may store valuable mediums used in the first medium handling device and a second medium handling device different from the first medium handling device. The communication unit may transmit the storage unit information, at least in a state where the storage unit is separated from the first medium handling device and the second medium handling device.

Thus, the controller can receive the storage unit information when, for example, the storage unit is being transited by a collection agent or the like.

The controller may control at least the first medium handling device. The storage unit may have a memory unit for storing valuable medium information on valuable mediums stored therein. The communication unit may transmit the valuable medium information stored in the memory unit. The controller may receive the valuable medium information transmitted by the communication unit, the controller causing the first medium handling device to perform reconciliation for the storage unit attached to the first medium handling device, based on the received valuable medium information.

Thus, a time required for the first medium handling device to perform reconciliation can be made shorter, thereby shortening an operation time for the collection agent or the like.

The storage unit may store valuable mediums collected from the first medium handling device, and have a memory unit for storing valuable medium information related to the stored valuable mediums. The communication unit may transmit the valuable medium information stored in the memory unit. The controller may receive the valuable medium information transmitted by the communication unit, the controller handling the valuable mediums stored in the storage unit, based on the received valuable medium information.

Thus, the controller can handle the valuable mediums stored in the storage unit.

The storage unit may store valuable mediums used in the first medium handling device and a second medium handling device different from the first medium handling device. The second medium handling device may count valuable mediums stored in the storage unit. The controller may receive the valuable medium information transmitted by the communication unit, the controller determining an operation mode in which the second medium handling device counts the valuable mediums, based on the received valuable medium information.

Thus, the controller can set an appropriate operation mode in the second medium handling device according to the valuable mediums stored in the storage unit.

The storage unit may store valuable mediums used in the first medium handling device and a second medium handling device different from the first medium handling device. The second medium handling device may count valuable mediums stored in the storage unit. The second medium handling device may include a plurality of second medium handling devices. The controller may receive the valuable medium information transmitted by the communication unit, the controller determining a second medium handling device for counting the valuable mediums, among the plurality of second medium handling devices, based on the received valuable medium information.

Thus, the controller can determine the second medium handling device for performing counting for the storage unit.

The controller may manage valuable mediums with which the medium handling device is replenished, based on the received valuable medium information.

Thus, the controller can manage valuable mediums with which the medium handling device is replenished.

The storage unit may store valuable mediums with which the medium handling device is replenished. The controller may transmit valuable medium information related to the valuable mediums stored in the storage unit, to the communication unit. The storage unit may have a memory unit for storing the valuable medium information received by the communication unit.

Thus, information on the valuable mediums stored in the storage unit can be stored in the memory unit of the storage unit, whereby the controller and/or the first medium handling device can obtain information on the valuable mediums stored in the storage unit via the communication network.

The communication unit may transmit positional information of the storage unit in a state where the storage unit is detached from the first medium handling device. The controller may monitor the storage unit based on the received positional information.

Thus, the controller can monitor the storage unit when, for example, the storage unit is being transited by the collection agent or the like.

The storage unit may include a discharging unit for discharging ink toward a valuable medium stored therein. The discharging unit may operate based on information received by the communication unit. The controller may transmit an instruction for causing the discharging unit to discharge the ink, via the communication network, to the communication unit.

Thus, in a case where, for example, the storage unit being transited is stolen, the controller can operate to adhere ink to valuable mediums stored in the storage unit. Thus, use of the valuable mediums stored in the stolen storage unit can be prevented.

The communication unit may transmit maintenance information for the storage unit. The controller may manage the storage unit based on the received maintenance information.

Thus, the controller can easily manage the storage unit.

The communication unit may transmit the maintenance information in a state where the storage unit is detached from the first medium handling device.

Thus, the controller can manage the storage unit while specifying a position of the storage unit.

The first storage unit may have a battery for supplying power to the first communication unit. The second storage unit may have a battery for supplying power to the second communication unit.

Thus, the first communication unit and the second communication unit can communicate with the controller and/or the first medium handling device also in a detached state from the first medium handling device.

The storage unit may be used for transiting valuable mediums, and may be detachably attached to the first medium handling device and a second medium handling device different from the first medium handling device. The communication unit may transmit the storage unit information, at least in a state where the storage unit is detached from the first medium handling device and the second medium handling device.

Thus, the controller can receive the storage unit information when, for example, the storage unit is being transited by the collection agent or the like.

The controller may perform a predetermined process by communicating with the communication unit of the storage unit being transited by a car for transit.

Thus, the controller can communicate with the communication unit of the storage unit being transited by a car for transit.

The controller may communicate with the communication unit by a Sigfox, LoRaWAN, ELTRES, ZETA, IM920, LTE-M, Cat.NB1 or NB-IoT communication method as a LPWA (low-power wide-area) standard.

Thus, the controller can communicate with the communication unit in compliance with a communication standard that allows reduction of power consumption and long distance communication.

The technique disclosed herein is directed to a valuable medium handling method. The valuable medium handling method includes: performing communication, via a communication network, between a controller and a communication unit disposed at a storage unit that is detachably attached to a first medium handling device and that stores valuable mediums; transmitting, by the communication unit, at least one of positional information of the storage unit and opening/closing-state information of a door of the storage unit, to the controller, in a state where the storage unit is detached from the first medium handling device; and monitoring, by the controller, the storage unit based on at least one of the positional information and the opening/closing-state information having been received.

In this configuration, in a state where the storage unit is detached from the first medium handling device, the communication unit transmits, to the controller, at least one of the positional information of the storage unit and the opening/closing-state information of the door of the storage unit. The controller monitors the storage unit based on at least one of the positional information and opening/closing-state information having been received. Thus, the controller can monitor the storage unit when, for example, the storage unit is being transited by the collection agent or the like.

The controller may have a display. The controller may cause the display to display information based on at least one of the positional information and the opening/closing-state information having been received.

Thus, the controller causes the display to display information on monitoring of the storage unit based on the positional information of the storage unit or the opening/closing-state information of the door of the storage unit, whereby the staff member of the collection agent is allowed to monitor the storage unit by checking the display.

As described above, the operability of the valuable medium handling system can be enhanced.

DETAILED DESCRIPTION

A configuration of a valuable medium handling device will be described below with reference to the drawings. However, the following description is merely illustrative.

(Valuable Medium Handling System)

Figure 1:
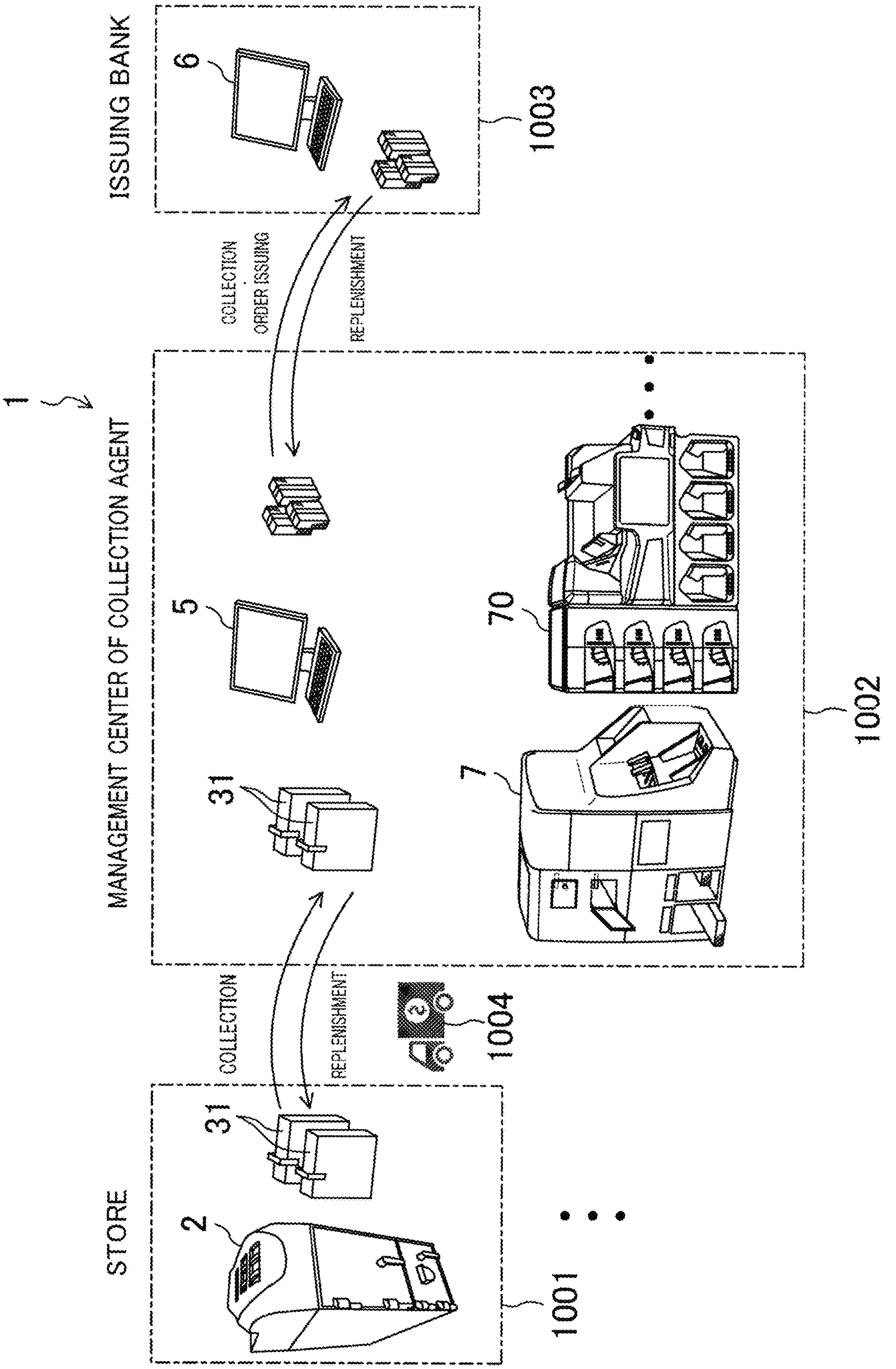
FIG. 1 is a conceptual diagram illustrating a configuration of a valuable medium handling system.
Figure 2:
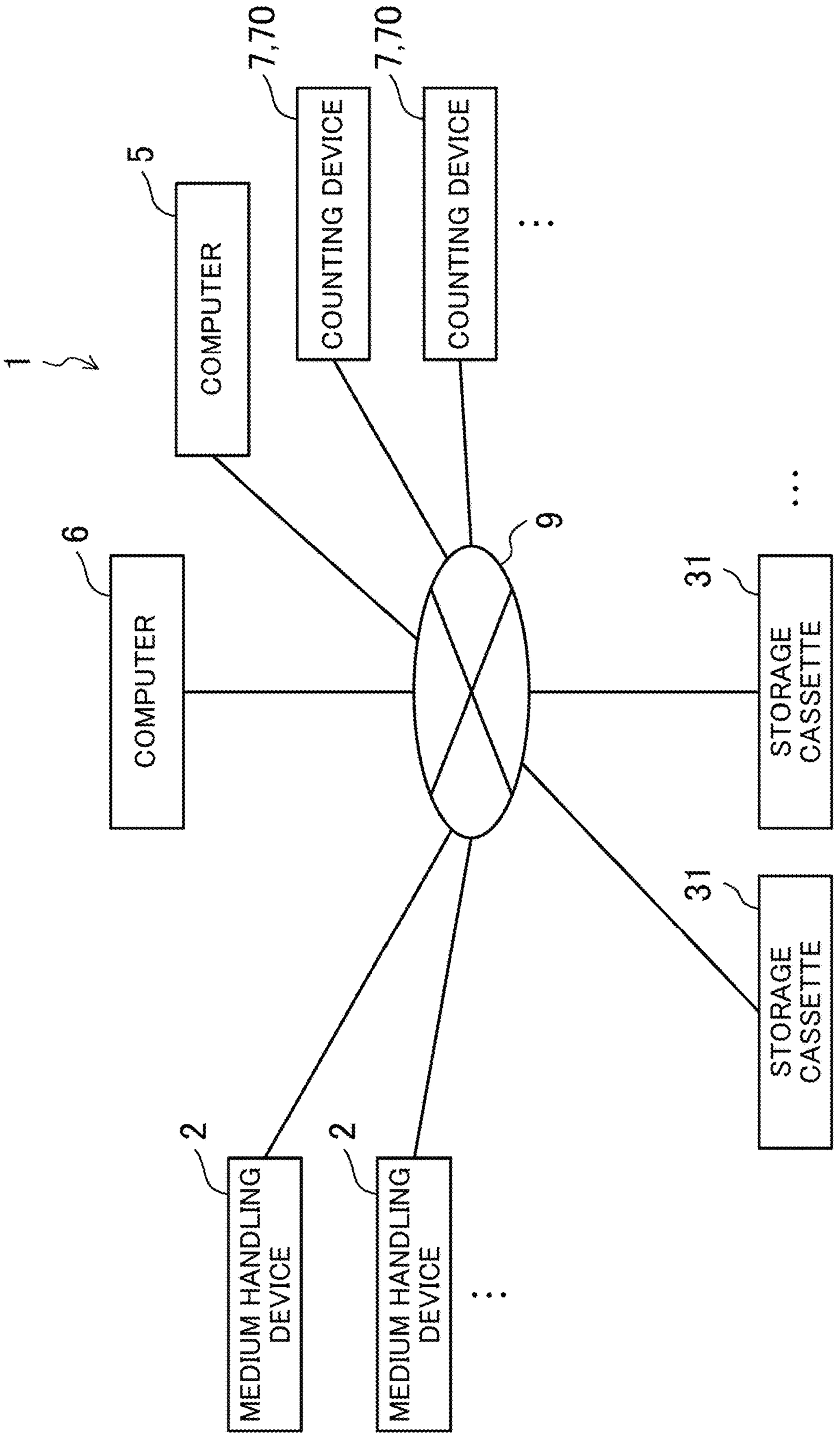
FIG. 2 is a conceptual diagram illustrating a communication network configuration of the valuable medium handling system.

FIG. 1 illustrates a configuration of a valuable medium handling system 1. FIG. 2 illustrates a communication network configuration of the valuable medium handling system. The valuable medium handling system 1 is configured in a CIT (Cash in Transit) system that includes various stores 1001, and a management center 1002 of a collection agent which has made a contract with each store 1001 for collecting valuable mediums as proceeds from sales of the store 1001. The CIT system described herein also includes an issuing bank 1003 for supplying valuable mediums to the management center 1002 in response to a request from the management center 1002. The following description will be made by using a banknote as an example of the valuable medium. The issuing bank 1003 mainly supplies so-called new series notes to the management center 1002.

In the exemplary configuration described herein, a medium handling device 2 for storing, for example, proceeds from sales (that is, banknotes) of the store 1001 is installed as a first medium handling device. The medium handling device 2 counts banknotes and stores banknotes in a storage cassette 31. The medium handling device 2 performs money depositing and dispensing The medium handling device 2 is connected to a communication line 9 as a communication network which is configured by, for example, the Internet. The type of the store 1001 is not particularly limited. The stores 1001 may be, for example, various retail stores. The store 1001 represents an example of a place at which the medium handling device 2 as the first medium handling device is installed. The medium handling device 2 as the first medium handling device may be installed in financial facilities as well as stores. The medium handling device 2 may be, for example, an ATM installed in a retail store or the like.

Banknotes are collected from the stores 1001 into the management center 1002 by a staff member of the collection agent. The banknotes are transited from each store 1001 to the management center 1002 by using the storage cassette 31 that has been detached from the medium handling device 2 as described below. For simplification, one store 1001 is illustrated in FIG. 1.

A computer 5 is disposed in the management center 1002 and connected to the communication line 9. The computer 5 may be, for example, a general-purpose PC (personal computer: see FIG. 1). In the present disclosure, the computer is not limited to a PC as shown in FIG. 1 and conceptually includes cloud computing. The process of the computer 5 described in the present embodiment may be executed by a resource of the cloud computing. The cloud computing may be abbreviated as cloud. As described below, the computer 5 communicates with a communication device 3001 disposed in the storage cassette 31 via the communication line 9, thereby managing banknotes.

In the management center 1002, a plurality of counting devices 7, 70 are installed as second medium handling devices, and connected to the communication line 9. The counting devices 7, 70 count banknotes collected into the management center 1002. The computer 5 determines the counting device 7, 70 for counting valuable mediums stored in the storage cassette 31, based on information received from the communication device 3001. The staff member of the collection agent causes the counting device 7, 70 determined by the computer 5 to count the valuable mediums in the storage cassette 31. For example, the valuable mediums having been counted are stored in a safe (not shown) or the like in the management center 1002 or transited to the store 1001 as valuable mediums for change.

The computer 5 provides an instruction for storing banknotes in the storage cassette 31. The banknotes are stored in the storage cassette 31 by the staff member of the collection agent, a robot, or the like that has received the instruction for storing the banknotes, from the computer 5. The storage cassette 31 in which banknotes are stored is transited by the staff member of the collection agent from the management center 1002 to the store 1001. The storage cassette 31 having been transited to the store 1001 is attached to the medium handling device 2 by the staff member of the collection agent.

In the issuing bank 1003, a computer 6 is installed and connected to the communication line 9. The computer 6 may be, for example, a general-purpose PC. The process of the computer 6 may be executed by a resource of cloud computing. The computer 6 receives a request from the computer 5 for replenishing banknotes, as described below. In the issuing bank 1003, an operation for replenishing banknotes for the management center 1002 is performed in response to the request from the computer 5 for replenishing banknotes.

As shown in FIG. 1, transit of the storage cassette 31 between the store 1001 and the management center 1002 is performed by a car 1004 for transit. Therefore, the computer 5 and the medium handling device 2 are configured to communicate with the communication device 3001 of the storage cassette 31 which is being transited by the car 1004 for transit.

(Configuration of Medium Handling Device)

Figure 3:
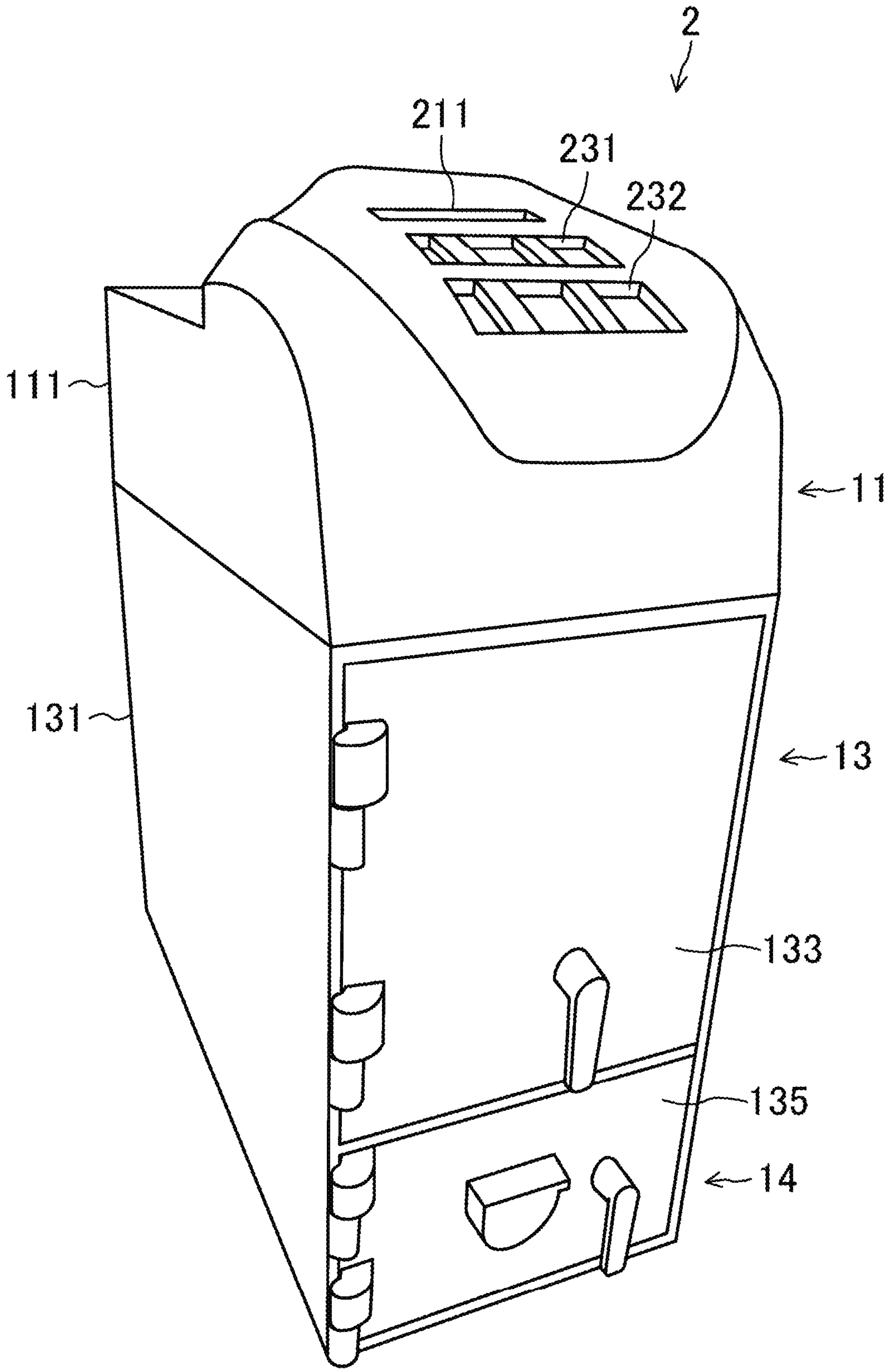
FIG. 3 is a schematic perspective view of a medium handling device.
Figure 4:
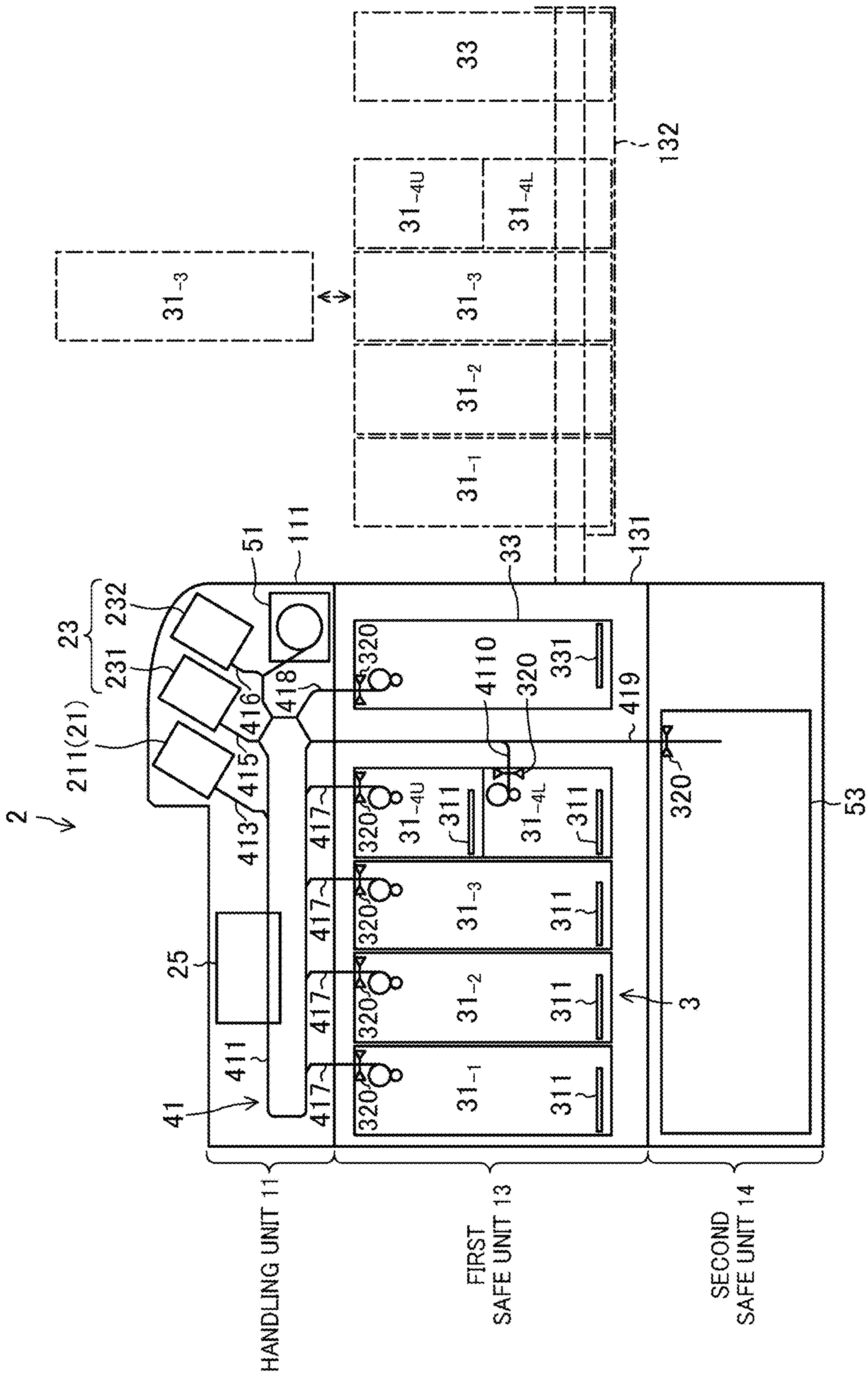
FIG. 4 is a schematic diagram illustrating an internal configuration of the medium handling device.

FIG. 3 and FIG. 4 illustrate a configuration of the medium handling device 2.

The medium handling device 2 performs at least operations of depositing in which banknotes as valuable mediums set in an inlet 211 are stored in a storage unit 3, and dispensing in which banknotes stored in the storage unit 3 are dispensed to a first or a second outlet 231, 232, as described below in detail. The medium handling device 2 is a so-called circulation-type depositing and dispensing machine. Banknotes which are dispensed during the dispensing operation include banknotes which are stored in the storage unit 3 during the depositing operation. In this exemplary configuration, a circulation-type depositing and dispensing machine is described as an example of the first medium handling device. However, the first medium handling device is not limited to such a configuration. Another medium handling device such as a depositing machine and a dispensing machine may be used as the first medium handling device.

The medium handling device 2 includes a handling unit 11 disposed in an upper portion, a first safe unit 13 disposed in an intermediate portion, and a second safe unit 14 disposed in a lower portion, as shown in FIG. 3 and FIG. 4. In a housing 111 forming the handling unit 11, a depositing unit 21 having the inlet 211, a dispensing unit 23 having the first and the second outlets 231, 232, a recognition unit 25 for recognizing banknotes, a dispensing-reject temporary storage unit (hereinafter, may be simply referred to as temporary storage unit) 51 for temporarily storing banknotes, and a transport unit 41 that includes a loop transport path 411 for connecting the depositing unit 21, the dispensing unit 23, the recognition unit 25, and the temporary storage unit 51 to each other, are disposed. Meanwhile, a housing 131 disposed below the housing 111 of the handling unit 11 forms the first and the second safe units 13, 14, and is a protective housing 131 configured to protect the storage unit 3 and the like housed therein at a predetermined or higher security level.

The first safe unit 13 has the storage unit 3 that includes a plurality (four in the illustrated example) of stacker-type storage cassettes 31 and similarly has a stacker-type reconciliation cassette 33. The second safe unit 14 has a collection cassette 53 disposed therein. A first opening/closing door 133 for opening/closing the first safe unit 13 and a second opening/closing door 135 for opening/closing the second safe unit 14 are separately disposed on the front surface of the protective housing 131. Authority for accessing the first safe unit 13 and authority for accessing the second safe unit 14 are different from each other.

The inlet 211 of the depositing unit 21 is an opening in which banknotes to be deposited are set during, for example, the depositing operation, as described above. The inlet 211 is opened upward at the upper surface of the housing 111 of the handling unit, and can simultaneously receive a plurality of banknotes. The depositing unit 21 also includes a feeding mechanism for feeding out the plurality of banknotes set in the inlet 211 one by one to the loop transport path 411.

The first and the second outlets 231, 232 of the dispensing unit 23 are each an opening through which banknotes are dispensed during, for example, the dispensing operation, as described above. The outlets 231, 232 are aligned in the front-rear direction in an area position from the upper surface toward the front surface of the housing 111 of the handling unit so as to be closer to the device front side (right side on the surface of the drawing sheet in FIG. 4) than the inlet 211 is, and are opened diagonally upward. The first and the second outlets 231, 232 are configured to stack transported banknotes and simultaneously hold a plurality of banknotes.

The recognition unit 25 is disposed on the loop transport path 411, and is configured to recognize the authentication, denominations, and fitness of banknotes transported along the loop transport path 411 one by one. Specifically, the recognition unit 25 has a sensor such as an image sensor, an infrared sensor, an ultraviolet sensor, and a magnetic sensor for obtaining characteristics of banknotes, determines whether or not the characteristics of the transported banknote match stored characteristics of each of various banknotes, and recognizes the denomination, authentication, and fitness. The recognition unit 25 also has a function of optically reading a serial number printed on a banknote. Reading the serial number means obtaining an image of a serial number printed at a predetermined position on a banknote and recognizing a character or a number of each digit of the serial number based on the obtained image. The recognition unit 25 may not read the serial number, and, instead thereof, a reading unit other than the recognition unit 25 may be disposed, for example, on the loop transport path 411. Furthermore, a controller 513 described below may perform functions of the recognition unit 25 other than the sensing function.

The transport unit 41 includes the loop transport path 411 disposed in the housing 111 of the handling unit in an endless manner. Banknotes are transported clockwise and counterclockwise in FIG. 4 along the loop transport path 411. The loop transport path 411 is configured by a combination of multiple rollers, a plurality of belts, a motor for driving the rollers and belts, a sensor for detecting the transported banknote, and a plurality of guides, which are not shown. The loop transport path 411 transports banknotes one by one along the transport path such that the long edge of the banknote is on the forward side in a state where the banknotes are separated from each other over a predetermined distance.

The loop transport path 411 and the inlet 211 are connected to each other via an inlet path 413, and a banknote set in the inlet 211 is transported via the inlet path 413 to the loop transport path 411.

Diverging paths 417 connected to the respective four storage cassettes 31 are connected to the loop transport path 411 via not-illustrated diverting mechanisms. The operation of each diverting mechanism is controlled to selectively transport a banknote transported on the loop transport path 411 via the diverging path 417 to one of the four storage cassettes 31 and store the banknote in the one thereof, and transport a banknote fed out from one of the storage cassettes 31 via the diverging path 417 to the loop transport path 411.

A first and a second dispensing paths 415, 416 are also connected to the loop transport path 411 via diverting mechanisms (not shown) for changing a banknote transporting direction. The leading end of the first dispensing path 415 is connected to the first outlet 231, and the leading end of the second dispensing path 416 is connected to the second outlet 232. At a position at which transport paths extending in three different directions are gathered, each diverting mechanism operates so as to transport a banknote transported from a predetermined direction selectively in another of two directions. A specific configuration of the diverting mechanism is disclosed in, for example, WO2009/034758. In this configuration, the operation of the diverting mechanism is controlled to selectively transport a banknote transported on the loop transport path 411, via the first or the second dispensing path 415, 416, to the first or the second outlet 231, 232.

A first connection path 418 connected to the reconciliation cassette 33 and a second connection path 419 connected to the collection cassette 53 are also connected to the loop transport path 411 via not-illustrated diverting mechanisms. Among the paths, the second connection path 419 extends so as to penetrate through the first safe unit 13 in the up-down direction, and has a diverging path 4110 disposed midway.

The diverging path 4110 is connected to a fourth storage cassette lower portion 31-4L described below.

Each of the diverting mechanisms disposed at positions at which the first connection path 418 is connected and the second connection path 419 is connected also operates such that, at a position at which transport paths extending in three different directions are gathered, a banknote transported from a predetermined direction is transported selectively in another of two directions. In this configuration, an operation of the diverting mechanism is controlled to selectively transport a banknote transported clockwise or counterclockwise on the loop transport path 411, via the first connection path 418 to the reconciliation cassette 33 or via the second connection path 419 to the fourth storage cassette lower portion 31-4L or the collection cassette 53. Furthermore, a banknote fed out from the reconciliation cassette 33 or the fourth storage cassette lower portion 31-4L and transported via the first or the second connection path 418, 419 is transported clockwise or counterclockwise on the loop transport path 411.

The storage unit 3 includes a first to a fourth stacker-type storage cassettes 31, as described above, in the illustrated example. In the following description, reference numeral "31" is used in a case where the storage cassettes are collectively referred to, and reference numerals "31-1, 31-2, 31-3 . . . " are used in a case where the first, the second, the third . . . storage cassettes are distinguished from each other. The number of the storage cassettes 31 is not particularly limited, and may be set to one or more as appropriate. The four storage cassettes 31 are aligned in the device depth direction (the left-right direction on the surface of the drawing sheet in FIG. 4) in this example.

As shown in FIG. 4, the storage unit 3 is drawable forward from the device in a state where the opening/closing door 133 of the first safe unit 13 is opened. In a state where the storage unit 3 has been drawn, each of the storage cassettes 31 and the reconciliation cassette 33 can be attached to/detached from the device.

Figure 6:
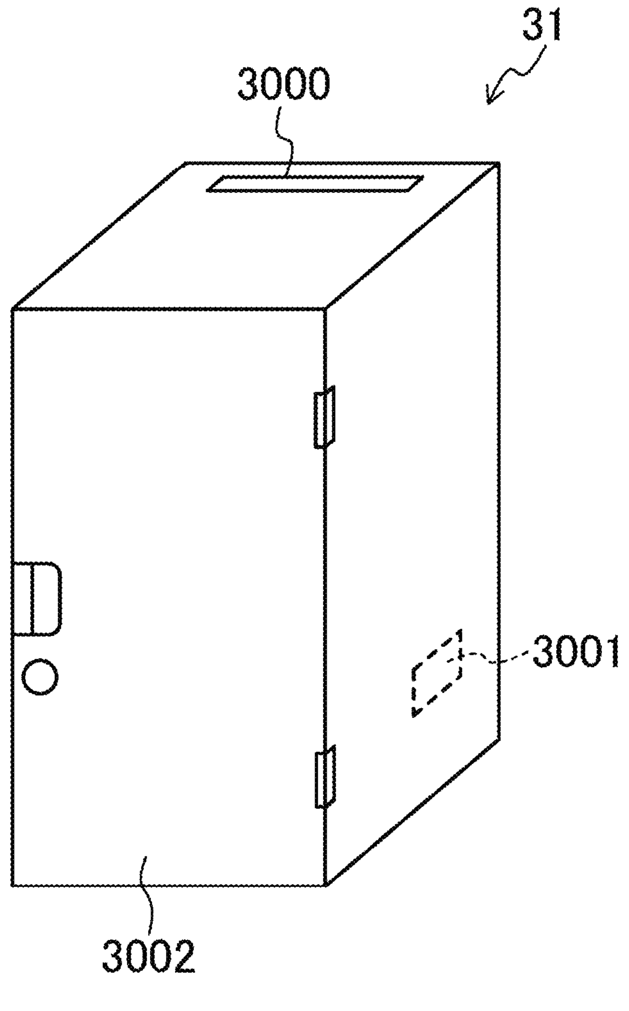
FIG. 6 is a schematic perspective view of a storage cassette.

FIG. 6 illustrates an example of the storage cassette 31. The first to the third storage cassettes 31-1, 31-2, 31-3 have the same configuration, and each have a shape elongated in the up-down direction. An outlet/inlet through which a banknote can pass is formed in the upper surface of each storage cassette 31 such that inside and outside of the cassette communicate with each other. An outlet/inlet 3000 through which a banknote can pass is formed in the upper surface of each storage cassette 31 such that inside and outside of the cassette communicate with each other, and the diverging path 417 or the second connection path 418 described above is detachably connected to the outlet/inlet 3000. A cassette door 3002 is disposed on the side surface of the storage cassette 31. The cassette door 3002 opens and closes by oscillating.

Each storage cassette 31 has the communication device 3001 as a communication unit. The communication device 3001 has a memory unit 3014 for storing cassette information as storage unit information on the storage cassette 31. The memory unit 3014 is, for example, a non-volatile memory. The communication device 3001 communicates with the medium handling device 2 via a cassette information communication unit 61 (see FIG. 5) disposed in the medium handling device 2 in a state where the storage cassette 31 is disposed at a predetermined position in the safe unit 13. The communication device 3001 communicates with the medium handling device 2 or the computer 5 via the communication line 9 in a state where the storage cassette 31 is not disposed at the predetermined position in the safe unit 13 (in other words, in a state where the storage cassette 31 has been detached from the medium handling device 2).

A stacking table 311 is disposed in each storage cassette 31 so as to ascend/descend according to an amount of banknotes stacked therein. Thus, the first to the third storage cassettes 31-1, 31-2, 31-3 are each configured to stack and store banknotes sent from the loop transport path 411 through the outlet/inlet of each cassette, on the stacking table 311, sequentially from the lower side toward the upper side, and feed out the banknotes stacked on the stacking table 311 through the outlet/inlet to outside of the cassette, that is, to the loop transport path 411, one by one sequentially from the upper side toward the lower side.

Meanwhile, the fourth storage cassette 31-4 has a partition therein, and the fourth storage cassette 31-4 is divided by the partition into a cassette upper potion (fourth storage cassette upper portion 31-4U) on the upper side and a cassette lower portion (fourth storage cassette lower portion 31-4L) on the lower side. The outlet/inlet of the fourth storage cassette upper portion 31-4U is formed in the upper surface thereof, whereas the outlet/inlet of the fourth storage cassette lower portion 31-4L is formed in the side surface thereof. The diverging path 417 that is diverged from the loop transport path 411 is connected to the outlet/inlet of the storage cassette upper portion 31-4U, and the diverging path 4110 that is diverged from the second connection path 419 is connected to the outlet/inlet of the storage cassette lower portion 31-4L. Thus, the fourth storage cassette upper portion 31-4U is configured to stack and store banknotes sent through the outlet/inlet from the loop transport path 411, on the stacking table 311, sequentially from the lower side toward the upper side, and feed out the banknotes stacked on the stacking table 311 through the outlet/inlet to the loop transport path 411 one by one sequentially from the upper side toward the lower side. Meanwhile, the fourth storage cassette lower portion 31-4L is configured to stack and store banknotes sent from the loop transport path 411 through the second connection path 419 and the outlet/inlet, on the stacking table 311, sequentially from the lower side toward the upper side, and feed out the banknotes stacked on the stacking table 311 through the outlet/inlet to the second connection path 419 and the loop transport path 411 one by one sequentially from the upper side toward the lower side.

The reconciliation cassette 33 is used for reconciliation for each storage cassette 31, as described below in detail, and has a capacity equivalent to or greater than a capacity of the storage cassette 31 such that all the banknotes stored in each storage cassette 31 can be stored. In general, the reconciliation cassette 33 is empty except for a time when the reconciliation is performed. The reconciliation cassette 33 is detachably attached to the housing 131 at a position on the side opposite to the fourth storage cassette 31-4 across the second connection path 419, in the first safe unit 13. The reconciliation cassette 33 is a stacker type cassette, similarly to the storage cassette 31, and has an outlet/inlet formed in the upper surface and has the stacking table 311 therein, similarly to the storage cassette 31. As described above, the outlet/inlet of the reconciliation cassette 33 is connected to the first connection path 418, and the reconciliation cassette 33 is configured to stack and store banknotes sent in the cassette from the loop transport path 411 through the outlet/inlet, on the stacking table 311, sequentially from the lower side toward the upper side, and feed out the banknotes stacked on the stacking table 311 through the outlet/inlet to the loop transport path 411, one by one sequentially from the upper side toward the lower side. The reconciliation cassette

33 may be configured as one (fifth storage cassette) of the storage cassettes 31 instead of the reconciliation cassette for reconciliation.

The dispensing-reject temporary storage unit 51 is connected to the diverging path that is diverged from a mid-point of the second dispensing path 416 connected to the second outlet 232. The temporary storage unit 51 temporarily stores rejected banknotes that occur during, for example, dispensing, as described below in detail. The temporary storage unit 51 is of a winding type, unlike the stacker-type storage cassette 31 and the like. The temporary storage unit is configured to include one tape for guiding a banknote, a guide member, and a reel for winding the tape together with a banknote, in a substantially rectangular box-shaped housing (see, for example, Japanese Laid-Open Patent Publication No. 2000-123219) or is configured to include two tapes for gripping a banknote and a reel for winding the two tapes gripping the banknote in a housing as disclosed in WO2011/036782. In each of the configurations, the winding-type temporary storage unit winds and stores banknotes one by one and feeds out the banknotes one by one in the reverse order of the storing order, thereby storing banknotes in a so-called first-in last-out method, The collection cassette 53 is detachably attached into the second safe unit 14, and is connected to the loop transport path 411 via the second connection path 419, as described above. The collection cassette 53 is a stacker-type storage unit. However, unlike the storage cassette 31 and the reconciliation cassette 33 described above, the collection cassette 53 has an elongated shape in the device depth direction, and includes therein a not-illustrated banknote pressing member that moves in the depth direction. The collection cassette 53 is configured to align and store the erected banknotes in the depth direction by moving the banknote pressing member according to an amount of stored banknotes.

Unlike the storage cassette 31 and the reconciliation cassette 33, the collection cassette 53 is configured such that the stored banknotes cannot be fed out. The collection cassette 53 stores, for example, overflow banknotes which cannot be stored in the storage unit 3, among banknotes set in the inlet 211 during depositing. Furthermore, rejected banknotes which cannot be recognized during dispensing or the like may be stored in the collection cassette 53.

As described below, banknotes to be collected may be stored in the collection cassette 53 during collection. The staff member of the collection agent detaches the collection cassette 53 from the medium handling device 2, and transits the collection cassette 53 to the management center 1002. The staff member of the collection agent may detach the storage cassette 31 from the medium handling device 2, and transit the storage cassette 31 to the management center 1002.

Similarly to the storage cassette 31, the collection cassette 53 has a communication device as a communication unit, which is not shown. The communication device communicates with the medium handling device 2 via the cassette information communication unit 61 disposed in the medium handling device 2 in a state where the collection cassette 53 is disposed in the second safe unit 14. The communication device communicates with the medium handling device 2 or the computer 5 via the communication line 9 in a state where the collection cassette 53 is not disposed in the second safe unit 14.

Figure 5:
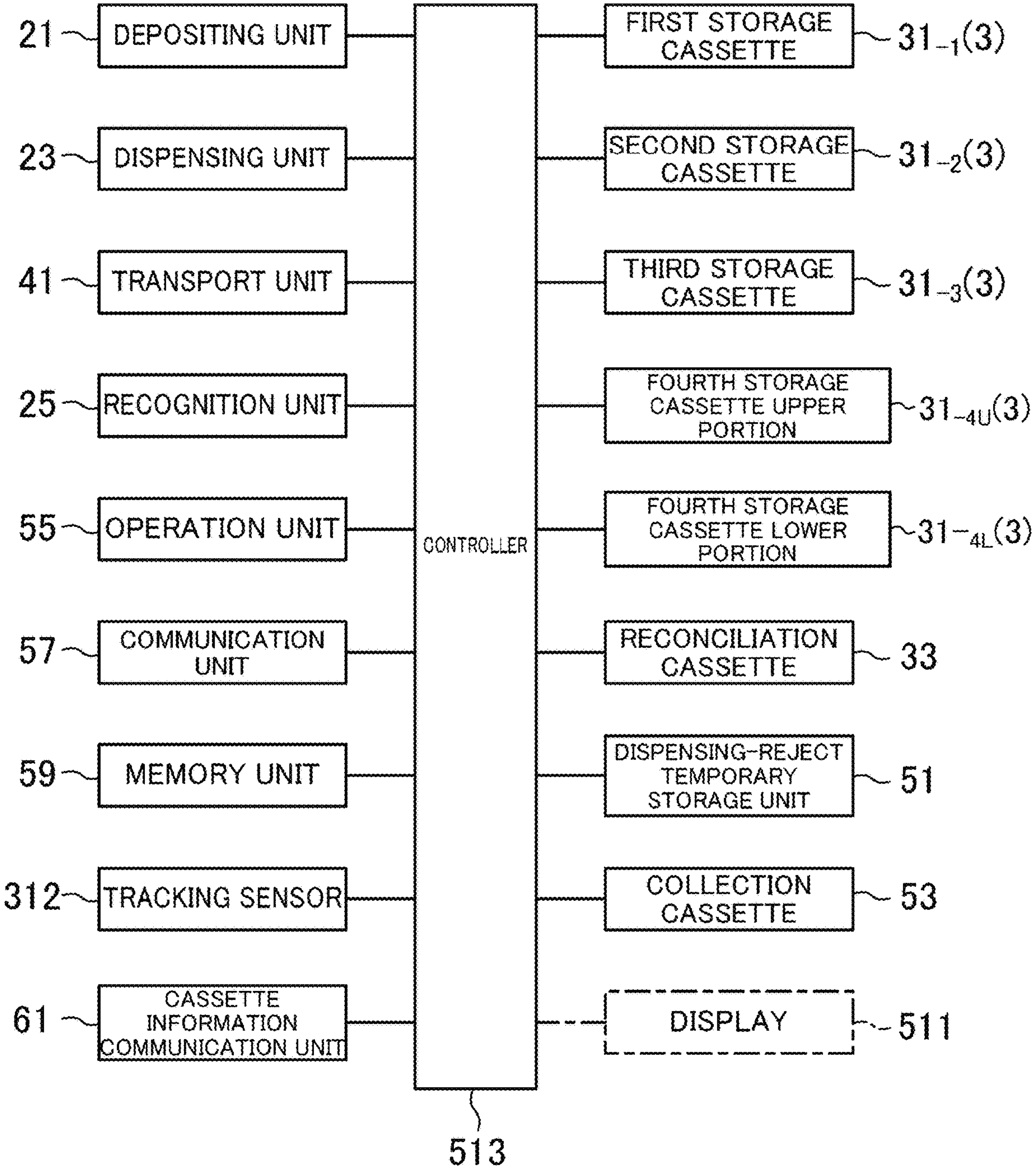
FIG. 5 illustrates a configuration for operation control of the medium handling device.

FIG. 5 illustrates a configuration for operation control of the medium handling device 2. The medium handling device 2 includes the controller 513 based on, for example, a known microcomputer. The depositing unit 21, the dispensing unit 23, the storage unit 3 including the first to the fourth storage cassettes 31, the reconciliation cassette 33, the dispensing-reject temporary storage unit 51, the collection cassette 53, and the transport unit 41, which are described above, are connected to the controller 513 such that a signal can be transmitted and received therebetween. The components 21, 23, 3, 33, 41, 51, and 53 include various sensors which have a function of detecting a transported banknote, such as a tracking sensor 320 disposed at the outlet/inlet of the storage cassette 31, the reconciliation cassette 33, and the collection cassette 53 for detecting passage of a banknote, as shown in, for example, FIG. 4. Detection signals from the various sensors are inputted to the controller 513. The controller 513 outputs a control signal based on the inputted detection signal or the like. The depositing unit 21, the dispensing unit 23, the recognition unit 25, the storage unit 3, the reconciliation cassette 33, the transport unit 41, the dispensing-reject temporary storage unit 51, and the collection cassette 53 operate according to the control signal.

The recognition unit 25 is also connected to the controller 513. The recognition unit 25 provides the controller 513 with a recognition result and a result of reading a serial number. Furthermore, an operation unit 55, a communication unit 57, and a memory unit 59 which are not illustrated in FIG. 1 or the like, are connected to the controller 513. The operation unit 55 serves as a human interface unit for an operator such as a teller who operates the medium handling device 2. The communication unit 57 allows the medium handling device 2 to transmit and receive a signal to and from a not-illustrated higher-order terminal and another device such as the computer 5 via, for example, a LAN or a serial bus. The memory unit 59 is implemented by a general-purpose storage device such as a hard disk drive and a flash memory for storing various information.

The memory unit 59 stores at least the number of banknotes stored in the medium handling device 2 or an inventory amount that is a monetary amount of the banknotes, for each denomination. The memory unit 59 also stores an inventory amount for each of the storage cassettes 31 and the collection cassette 53. In the medium handling device 2, banknotes are managed by using serial numbers. The memory unit 59 arranges the serial numbers of the banknotes stored in each unit in the order in which the banknotes are stored, and also stores a serial number list in which the serial numbers are associated with the consecutive numbers, respectively, corresponding to the number of the stored banknotes.

A display 511 implemented by, for example, a flat panel display for displaying various information can be optionally mounted to the medium handling device 2. The display 511 is also connected to the controller 513. The display 511 may be implemented by a touch-panel type display so as to integrate the display 511 and the operation unit 55 with each other.

The controller 513 controls operations of the depositing unit 21, the dispensing unit 23, the recognition unit 25, the storage unit 3, the reconciliation cassette 33, the transport unit 41, the dispensing-reject temporary storage unit 51, the collection cassette 53, the operation unit 55, the communication unit 57, the memory unit 59, and the display 511, according to an instruction received from the higher-order terminal via the communication unit 57 and/or various instructions received via the operation unit 55. Thus, the medium handling device 2 performs various processes such as depositing, dispensing, collection, and reconciliation described below. The history of various processes executed by the medium handling device 2 is stored in the memory unit 59 as log.

The cassette information communication unit 61 for communicating with the communication device 3001 disposed in each storage cassette 31 is also connected to the controller 513, and the cassette communicates with the medium handling device 2 via the cassette information communication unit 61 disposed in the medium handling device 2 in a state where the storage cassette 31 or the collection cassette 53 is attached to the medium handling device 2, as described above.

Figure 7:
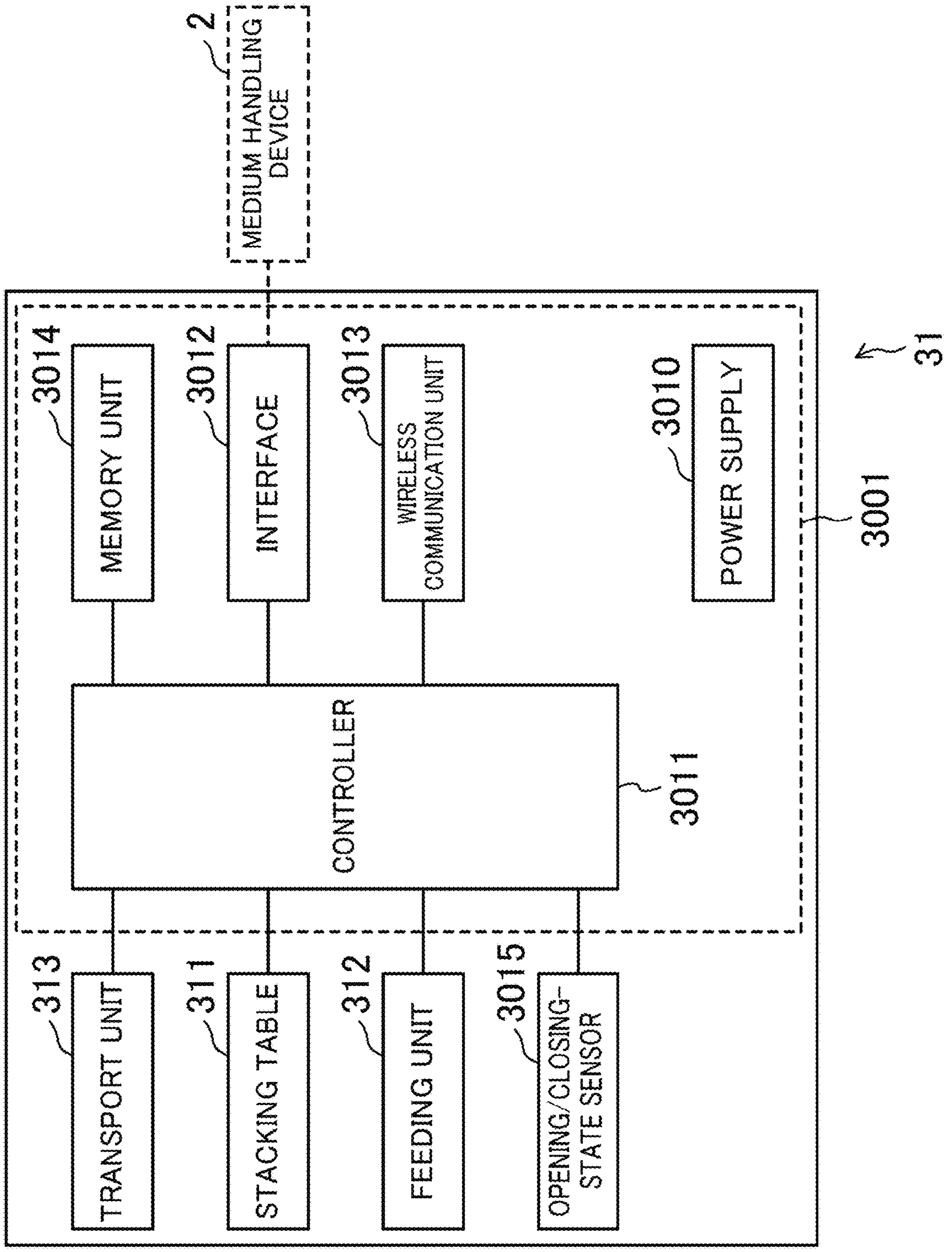
FIG. 7 illustrates a configuration for operation control of the storage cassette.

FIG. 7 illustrates a configuration for operation control of the storage cassette. The storage cassette 31 includes a controller 3011 based on, for example, a known microcomputer. The stacking table 311, a feeding unit 312 for feeding out banknotes stacked on the stacking table 311, and a transport unit 313 for transporting banknotes between the stacking table 311 and the outlet/inlet 3000 are connected to the controller 3011 such that a signal can be transmitted and received therebetween. The storage cassette 31 includes various sensors necessary for storing and feeding out banknotes.

An opening/closing-state sensor 3015 for detecting that the opening/closing door 133 of the storage cassette 31 has been opened is connected to the controller 3011. The opening/closing-state sensor 3015 outputs an opening-state signal to the controller 3011 when the opening/closing door 133 has been opened.

An interface 3012, a wireless communication unit 3013, and the memory unit 3014 are connected to the controller 3011. The interface 3012 is connected to the cassette information communication unit 61 in order to transmit and receive a signal to and from the medium handling device 2. The wireless communication unit 3013 is connected to the communication line 9 by wireless communication in order to transmit and receive a signal to and from the higher-order terminal (for example, the medium handling device 2, the computer 5, and the like) and another device. The memory unit 3014 is implemented by a general-purpose storage device such as a hard disk drive or a flash memory for storing various information. The wireless communication unit 3013 transmits and receives a signal to and from the higher-order terminal and another device in compliance with a wireless communication standard such as a LPWA (Low Power Wide Area) standard that allows long-distance data transfer with low power consumption. Examples of the LPWA communication standard include Sigfox, LoRaWAN, ELTRES, ZETA, IM920, LTE-M, Cat.NB1, and NB-IoT communication methods.

The memory unit 3014 stores cassette information on the provided storage cassette 31. The cassette information includes, for example, a serial number of the storage cassette 31, an attached/detached state of the storage cassette 31 with respect to the medium handling device 2, a type and a serial number of the medium handling device 2 to which the storage cassette 31 is attached, and an opened/closed state of the opening/closing door 133, and banknote information on banknotes stored in the storage cassette 31. The banknote information includes currency, denominations, series, fitness, a serial number list, and the like of the banknotes stored in the storage cassette 31. The cassette information stored in the memory unit 3014 can be read and written by an external higher-order terminal (for example, the medium handling device 2, the computer 5, and the like), as described below.

The controller 3011 controls operations of the stacking table 311, the feeding unit 312, the transport unit 313, the interface 3012, the wireless communication unit 3013, and the memory unit 3014 according to an instruction received via the interface 3012 or the wireless communication unit 3013 from the higher-order terminal (for example, the medium handling device 2, the computer 5, and the like).

The controller 3011 reads the cassette information stored in the memory unit 3014 and writes the cassette information into the memory unit 3014 in response to various instructions received from the higher-order terminal via the interface 3012 or the wireless communication unit 3013.

The storage cassette 31 includes a power supply 3010 such that the above-described operation can be performed also in a state where the storage cassette 31 is detached from the medium handling device 2. The power supply 3010 includes, for example, a battery for supplying power to each unit of the communication device 3001. The wireless communication unit 3013 communicates with the higher-order terminal and another device by wireless communication with low power consumption, whereby life span of the battery of the power supply 3010 can be made long. For example, a primary battery, a secondary battery, or a solar battery may be used as the power supply 3010. Alternatively, another kind of battery may be used.

The communication device 3001 includes the controller 3011, the interface 3012, the wireless communication unit 3013, the memory unit 3014, and the power supply 3010. In the example illustrated in FIG. 7, the storage cassette 31 includes one controller 3011, and the controller 3011 performs both control of the communication device 3001 and control for moving banknotes (valuable mediums) in the cassette such as control of the transport unit 313. However, the storage cassette 31 may include a plurality of controllers such that a part of the controllers controls the communication device 3001, and other controllers perform control for moving banknotes (valuable mediums) in the cassette such as control of the transport unit 313.

The collection cassette 53 also includes a communication device having the same configuration as the storage cassette 31, which is not illustrated. However, the collection cassette 53 does not feed out banknotes and does not have the feeding unit 312.

(Depositing)

Depositing is a process for depositing (storing) banknotes in the medium handling device 2. A banknote set in the inlet 211 is stored in one of the storage cassettes 31 according to a recognition result by the recognition unit 25 and a preset storage allocation. More specifically, the medium handling device 2 operates as follows during the depositing. That is, a depositing start command is inputted to the medium handling device 2 by, for example, an operation of the higher-order terminal and/or an operation on the operation unit 55 in a state where banknotes to be deposited are set in the inlet 211. The feeding mechanism of the depositing unit 21 feeds out banknotes in the inlet 211 one by one, and the transport unit 41 transports each banknote to the recognition unit 25, as indicated by a solid line arrow in FIG. 8. The recognition unit 25 recognizes and counts the banknotes. At this time, the serial number is read in real time.

Figure 8:
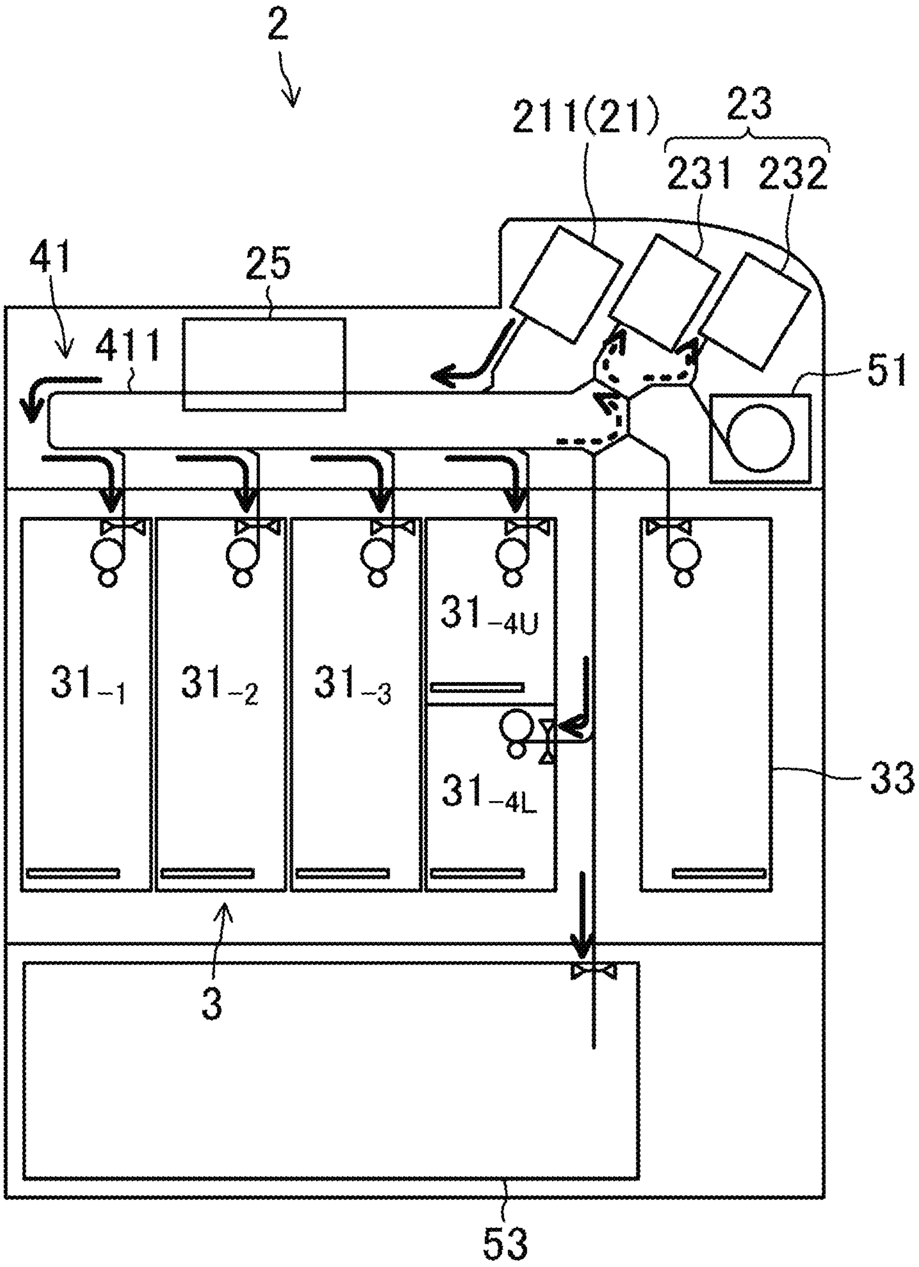
FIG. 8 illustrates a banknote transport path during depositing.

As indicated by solid line arrows in FIG. 8, the transport unit 41 also stores a banknote (the banknote is referred to as a normal banknote in contrast to a rejected banknote) which has been normally recognized by the recognition unit 25 and in which any predetermined or greater number of digits have been read in the serial number (for example, a banknote in which all the digits have been read or a banknote in which about one or two digits have not been read), in a predetermined one of the storage cassettes 31, according to the recognition result and the preset storage allocation. That is, each banknote is stored in one of the first to the fourth storage cassettes 31 according to the denomination and fitness. Thus, the medium handling device 2 stores banknotes directly in the storage cassettes 31 during the depositing. A banknote (normal banknote) having a denomination which is not allocated to the storage cassette 31 or an unfit note is stored in the collection cassette 53. Also in a case where, for example, the allocated storage cassette 31 is full, a normal banknote is stored in the collection cassette 53.

Meanwhile, the transport unit 41 dispenses, to the second outlet 232, a rejected banknote which cannot be received by the medium handling device 2 as it is, such as a banknote of which authentication cannot be recognized by the recognition unit 25, as indicated by a broken line arrow in FIG. 8. The rejected banknote that has occurred during the depositing is set again in the inlet 211, and is recognized again by the recognition unit 25.

A banknote which cannot be stored since both the storage cassette 31 and the collection cassette 53 are full during the depositing is dispensed to the first outlet 231 as indicated by a broken line arrow in FIG. 8. The rejected banknote may be dispensed to the first outlet 231 and the banknote which cannot be stored may be dispensed to the second outlet 232.

After the depositing has ended, an inventory amount stored in the memory unit 59 is updated. At the same time, the serial number list in which the serial numbers of banknotes stored in each of the storage cassettes 31 are arranged in the order in which the banknotes have been stored is updated according to the banknotes being stored. The serial numbers in the serial number list are arranged according to the order in which the banknotes have passed in the recognition unit 25.

(Dispensing)

Dispensing is a process for dispensing banknotes stored in the medium handling device 2. Specifically, the dispensing is started by a predetermined dispensing operation in which the higher-order terminal and/or the operation unit 55 designate at least a denomination and the number of banknotes. The storage unit 3 feeds out the designated number of banknotes having the designated denomination from the storage cassette 31 in which the corresponding banknotes are stored, as indicated by, for example, solid line arrows in FIG. 9. The transport unit 41 transports the fed banknotes via the loop transport path 411 to the recognition unit 25, and the recognition unit 25 recognizes the banknotes and reads the serial numbers, and, thereafter, normal banknotes are dispensed to the first outlet 231.

Figure 9:
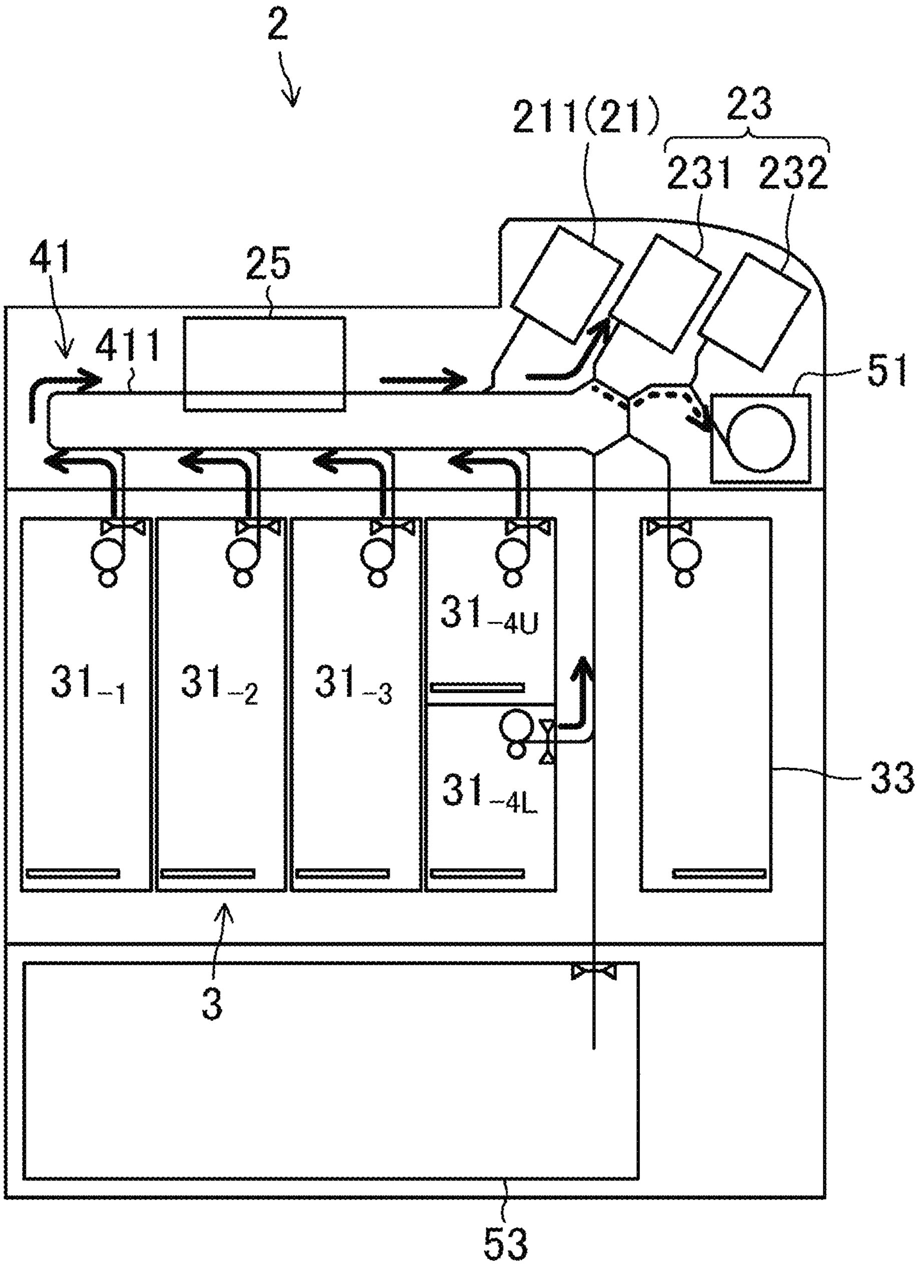
FIG. 9 illustrates a banknote transport path during dispensing.

In a case where a rejected banknote which cannot be recognized by the recognition unit 25 occurs during the dispensing, the rejected banknote is transported to and stored in the dispensing-reject temporary storage unit 51 as indicated by a broken line arrow in FIG. 9. A banknote of which the serial number cannot be read is also stored in the dispensing-reject temporary storage unit 51. The banknote stored in the temporary storage unit 51 is stored in the storage cassette 31 or the collection cassette 53 as appropriate after the dispensing has ended.

After the dispensing has ended, an inventory amount stored in the memory unit 59 is updated, and the serial number list for each storage cassette 31 is also updated according to the banknotes being fed out.

(Collection)

Figure 10:
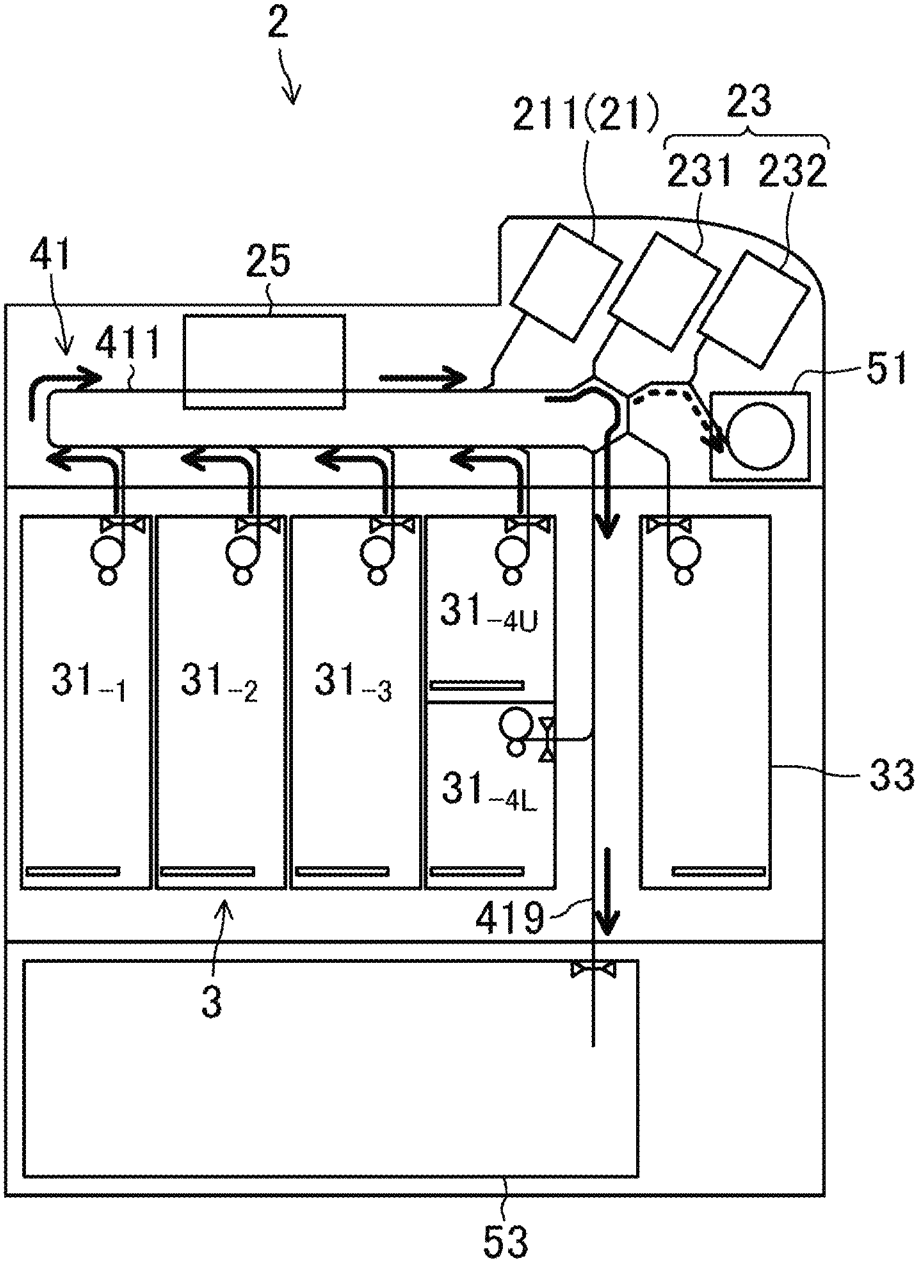
FIG. 10 illustrates a banknote transport path during collection.

Collection is a process for transporting banknotes stored in the storage cassette 31 to the collection cassette 53. Specifically, the collection is started by a predetermined collection operation in which the higher-order terminal and/or the operation unit 55 designate at least a denomination. In a case where the storage cassette 31 storing banknotes having the designated denomination is the first to the third storage cassette 31-1, 31-2, 31-3 or the fourth storage cassette upper portion 31-4U, the storage unit 3 sequentially feeds out banknotes having the designated denomination, from the storage cassette 31 storing the banknotes, as indicated by a solid line arrow in FIG. 10. The transport unit 41 transports the fed banknotes, via the loop transport path 411, to the recognition unit 25, and the recognition unit 25 recognizes the banknotes and reads the serial numbers, and, thereafter, normal banknotes are transported from the loop transport path 411 via the second connection path 419 to the collection cassette 53. Thus, banknotes are stored in the collection cassette 53. Meanwhile, a rejected banknote is stored in the dispensing-reject temporary storage unit 51, as indicated by a broken line arrow in FIG. 10.

Figure 11:
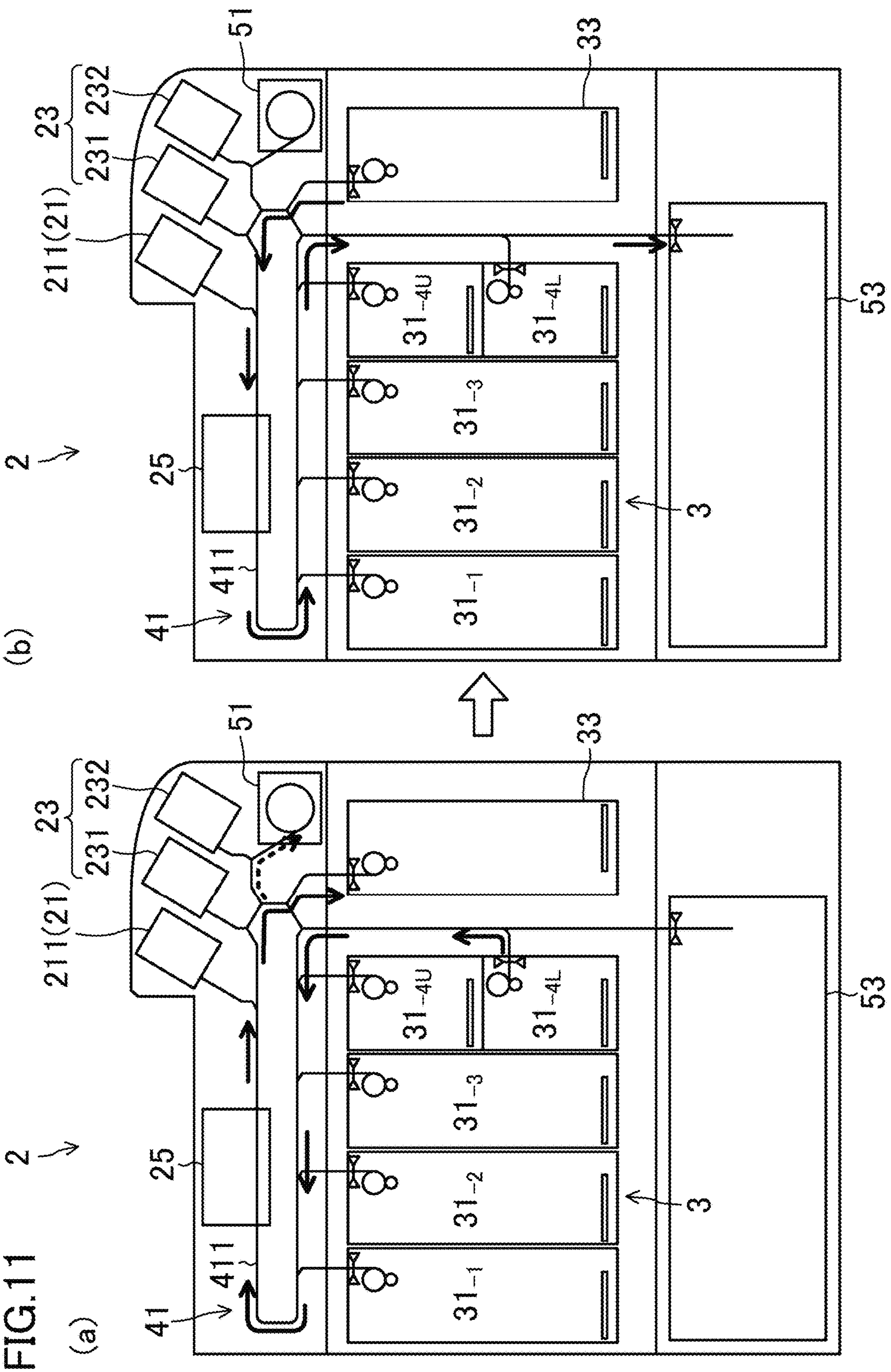
FIG. 11 illustrates a banknote transport path for collecting banknotes from a fourth storage cassette lower portion.

Meanwhile, in a case where banknotes having the denomination designated in the collection are stored in the fourth storage cassette lower portion 31-4L, the transport unit 41 transports banknotes having been fed out from the fourth storage cassette lower portion 31-4L, from the second connection path 419, via the loop transport path 411, to the recognition unit 25, and the recognition unit 25 recognizes the banknotes and reads the serial numbers, and, thereafter, normal banknotes are transported to the reconciliation cassette 33, as shown in FIG. 11A. Meanwhile, a rejected banknote is stored in the dispensing-reject temporary storage unit 51 as indicated by a broken line arrow in FIG. 11. After all the banknotes having been fed out from the fourth storage cassette lower portion 31-4L are stored in the reconciliation cassette 33, the reconciliation cassette 33 feeds out banknotes one by one, and the transport unit 41 transports the banknotes from the loop transport path 411 via the second connection path 419 to the collection cassette 53, as indicated by a solid line arrow in FIG. 11B. Thus, banknotes in the fourth storage cassette lower portion 31-4L are stored in the collection cassette 53.

Also after the collection has ended, an inventory amount stored in the memory unit 59 is updated, and the serial number list for each storage cassette 31 is updated.

Banknotes to be collected may be stored in the first to the third storage cassette 31-1, 31-2, 31-3 or the reconciliation cassette 33 and the cassette may be used as a collection cassette, during the collection, which is not shown.

(Reconciliation)

Reconciliation is a process for accepting banknotes stored in the storage cassette 31, and the medium handling device 2 can perform two kinds of reconciliation processes, which are an overall reconciliation process in which all banknotes stored in the storage cassette 31 are temporality fed out, and a partial reconciliation process in which a part of banknotes stored in the storage cassette 31 is fed out.

Among the processes, the overall reconciliation process is performed when it is detected that the storage cassette 31 has been detached from the device, and the door disposed therein has been once opened. This process is performed because, once the storage cassette 31 has been opened, a part of the stored banknotes may be taken out, or the order in which the banknotes are stored may be changed, and the number of the banknotes stored in the storage cassette 31 and the order in which the banknotes are stored become unaccepted. Also in a case where the storage cassette 31 is changed, the overall reconciliation process is performed. Furthermore, the overall reconciliation process is performed also in a case where, although the banknotes in the storage cassette 31 have been accepted, an instruction for the overall reconciliation process is provided by, for example, the higher-order terminal in order to perform the accepting process again by recounting the banknotes and reading the serial numbers again. Such an overall reconciliation process is individually performed for each of the storage cassettes 31, or performed sequentially for all the storage cassettes 31, depending on the occasion.

Figure 12:
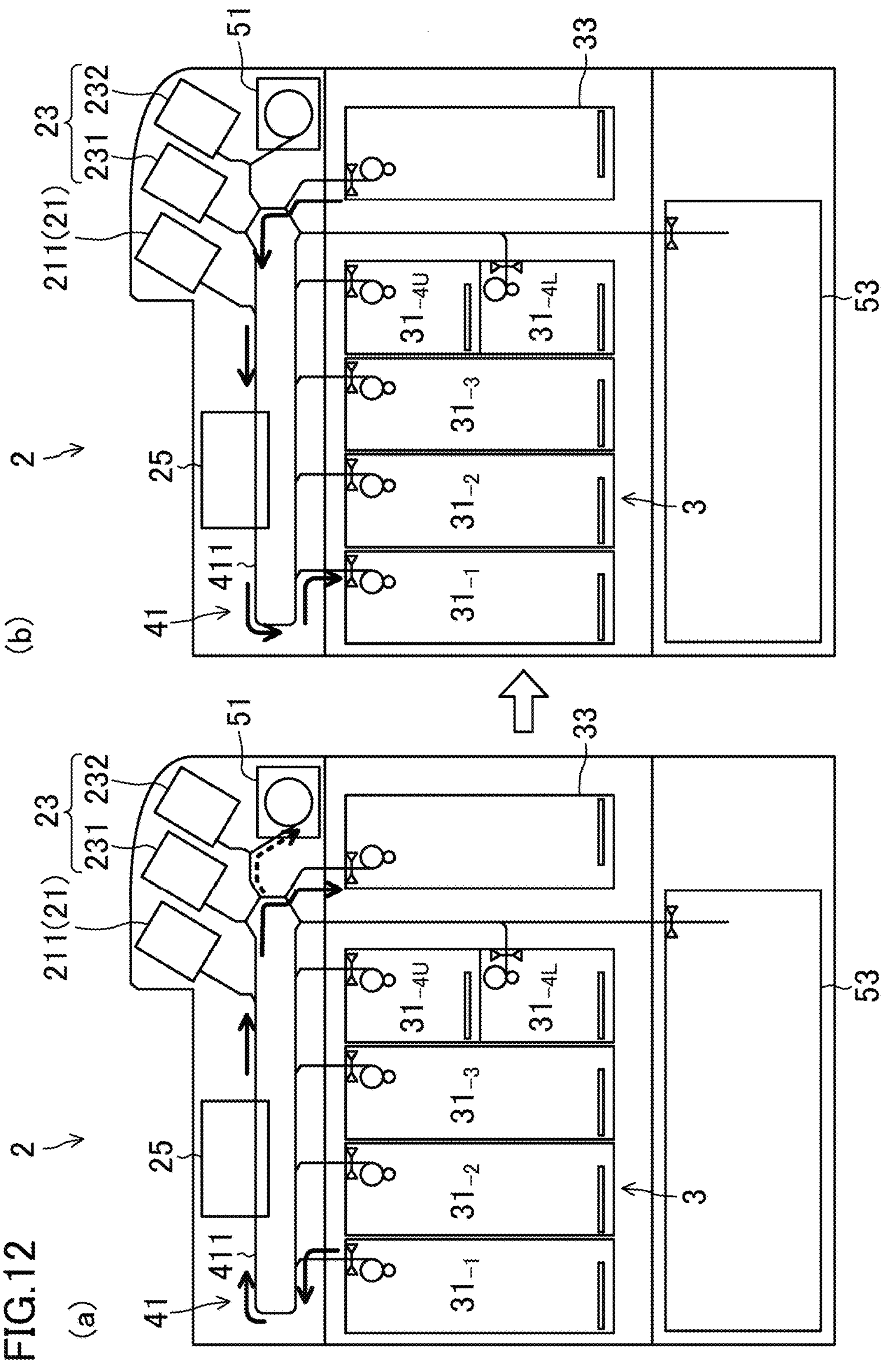
FIG. 12 illustrates a banknote transport path during reconciliation.

Specifically, in the overall reconciliation process, as shown in FIG. 12A, banknotes are fed out one by one from the storage cassette 31 (in the illustrated example, the first storage cassette 31-1 is a cassette for which the reconciliation is to be performed) for which the reconciliation is to be performed. The transport unit 41 transports the fed banknotes via the loop transport path 411 to the recognition unit 25, and the recognition unit 25 recognizes and counts the banknotes, and reads the serial numbers. A normal banknote in which all the digits of the serial number can be read is transported to the reconciliation cassette 33 and stored therein as indicated by a solid line arrow in FIG. 12. Meanwhile, a rejected banknote is transported to and stored in the dispensing-reject temporary storage unit 51 as indicated by a broken line arrow in FIG. 12.

Thus, after all the banknotes stored in the storage cassette 31 for which the reconciliation is to be performed have been fed out and counted, the banknotes stored in the reconciliation cassette 33 are fed out one by one, and transported via the loop transport path to the recognition unit 25 as shown in FIG. 12B. The recognition unit 25 recognizes and counts the banknotes and reads the serial numbers again, and, thereafter, normal banknotes are stored in the previous storage cassette 31, that is, the storage cassette 31 for which the reconciliation is to be performed. Thus, the banknotes stored in the storage cassette 31 are accepted and an inventory amount stored in the memory unit 59 is updated, and the serial number list for the storage cassette 31 is also updated. A rejected banknote that occurs while the banknotes are returned from the reconciliation cassette 33 to the storage cassette 31 is transported to and stored in the dispensing-reject temporary storage unit 51.

Meanwhile, the partial reconciliation process is performed in a case where an abnormality occurs while banknotes are transported from the storage cassette 31 or banknotes are transported to the storage cassette 31. The abnormality may cause an error in the number of banknotes stored in the storage cassette 31, and, thus, the banknotes stored in the storage cassette 31 need to be accepted. The abnormality described herein includes, for example, abnormality (overlapping) in which the recognition unit 25 detects that a plurality of banknotes are fed out in an overlapping state during dispensing or abnormality (jamming) in which a banknote being transported is jammed during depositing.

In a case where overlapping occurs during dispensing, the number of banknotes having been fed out from the storage cassette 31 becomes unaccepted, so that the inventory amount in the storage cassette 31 after the dispensing becomes unaccepted. Therefore, the partial reconciliation process is performed for all the storage cassettes 31 in which the overlapping has occurred, and at least the inventory amount for each storage cassette 31 needs to be accepted.

In a case where jamming occurs during depositing, the operator needs to remove the banknote to eliminate the jamming. In a case where jamming occurs near the inlet opening of the storage cassette 31, the banknotes determined to have been stored in the storage cassette 31 are removed, and an error in the number of banknotes in the storage cassette 31 may occur. Therefore, reconciliation needs to be performed for the storage cassette 31 in which the error is likely to have occurred due to the abnormality.

In the partial reconciliation process, only a part of banknotes stored in the storage cassette 31 is fed out according to the above-described serial number list to accept the banknotes stored in the storage cassette 31. As compared with the overall reconciliation process, load on the reconciliation is reduced, and a time necessary for the process is substantially shortened.

Specifically, the storage cassette 31 for which the reconciliation is to be performed feeds out banknotes, and the recognition unit 25 reads the serial numbers of the fed banknotes. The controller 513 checks the read serial numbers against the serial number list for the storage cassette 31. In the serial number list, the serial numbers are arranged in the order in which the banknotes are stored in the storage cassette 31. Therefore, the positions of the serial numbers in the serial number list are specified, whereby banknotes left in the storage cassette 31 can be specified. That is, the controller 513 can accept the banknotes stored in the storage cassette 31.

(Configuration of Counting Device)

Figure 13:
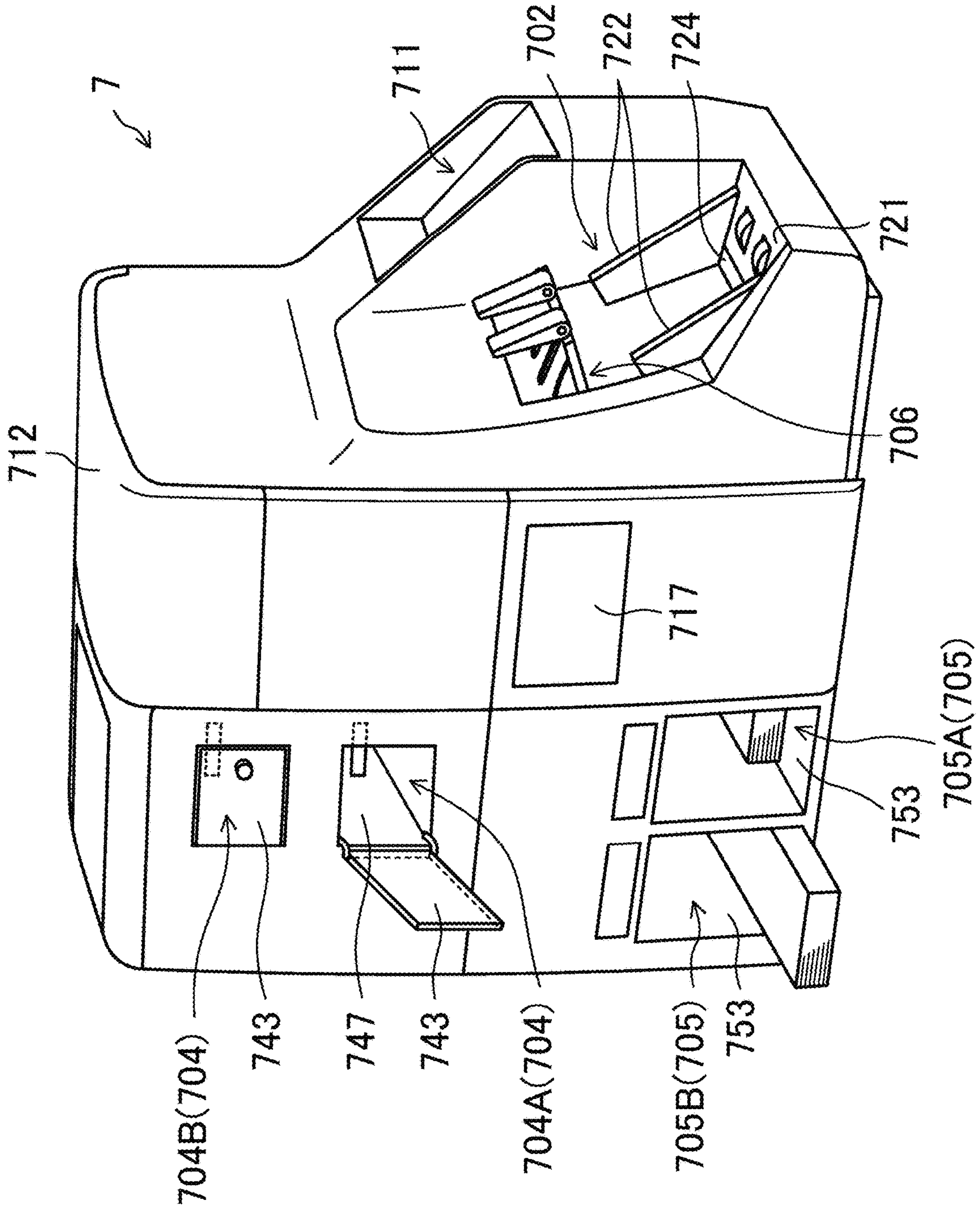
FIG. 13 illustrates an outer appearance of a counting device.
Figure 14:
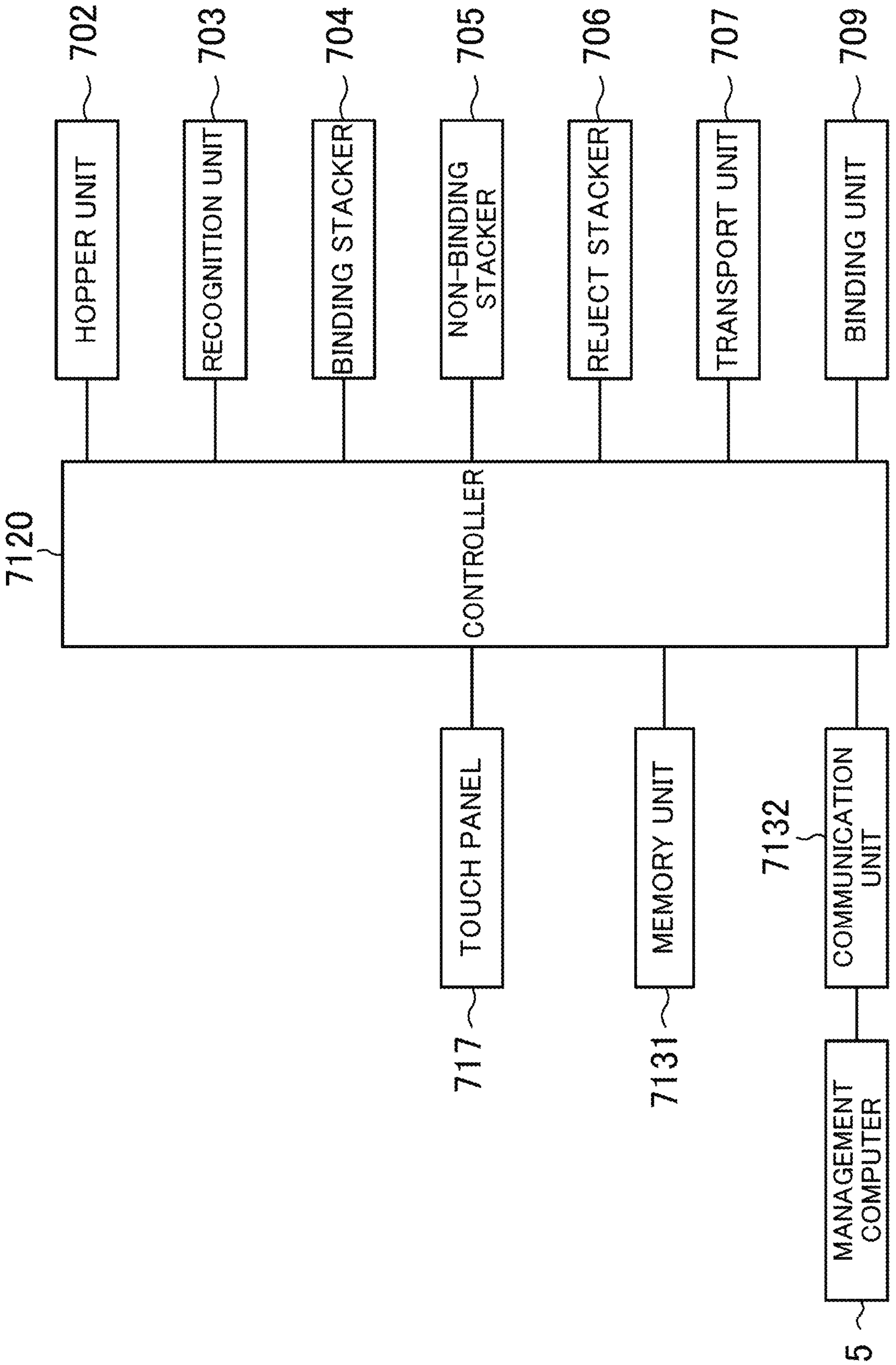
FIG. 14 is a block diagram illustrating a schematic configuration of the counting device.

FIG. 13 illustrates an outer appearance of the counting device 7. FIG. 14 is a block diagram illustrating a schematic configuration of the counting device 7. The counting device 7 is a banknote sorting machine that has a function of taking in loose banknotes and counting the banknotes, and sorting and stacking the banknotes according to the kinds and denominations, and the states of the banknotes. The counting device 7 also has a function of binding banknotes.

The counting device 7 includes a hopper unit 702 on which banknotes are placed and which takes in the banknotes, a recognition unit 703 for recognizing banknotes, a binding stacker 704 on which banknotes to be bound are stacked, a non-binding stacker 705 on which banknotes that are not to be bound are stacked, a reject stacker 706 on which rejected banknotes are stacked, a transport unit 707 for transporting banknotes taken in from the hopper unit 702, a binding unit 709 for binding banknotes, a discharge unit 711 for discharging bound banknotes, and a box-shaped housing 712 for housing the recognition unit 703, the binding stacker 704, the non-binding stacker 705, the reject stacker 706, a first transport unit 707, a second transport unit 708, the binding unit 709, and a third transport unit 710.

The binding stacker 704 includes two stackers, which are a first binding stacker 704A and a second binding stacker 704B. The first binding stacker 704A and the second binding stacker 704B each stack banknotes to be bound. Banknotes which are stacked as banknotes to be bound can be set as appropriate. The binding stacker 704 can also stack banknotes which are not to be bound.

The binding stacker 704 has a door 743 (see FIG. 13) for opening and closing a first take-out opening 747 which opens at the side surface of the housing 712.

The non-binding stacker 705 includes two stackers, which are a first non-binding stacker 705A and a second non-binding stacker 705B. The first and the second non-binding stackers 705A, 705B are aligned substantially in the horizontal direction. The non-binding stacker 705 has a second take-out opening 753 which opens at the side surface of the housing 712.

The recognition unit 703 is configured to recognize denominations, authentication, and fitness of transported banknotes one by one. Specifically, the recognition unit 703 has a line sensor 731 and a magnetic sensor 732, and obtains characteristics of the banknote. The recognition unit 703 determines whether or not the characteristics of the banknote match stored characteristics of each of various banknotes, and recognizes the currency, denomination, issue year, new/old, authentication, and fitness. The new/old represents information of a version of a banknote.

The recognition unit 703 sorts fitness of banknotes into three levels, which are levels representing ATM fit notes (ATM), teller fit notes (TLR), and unfit notes (UNFIT). The ATM fit note refers to a fit note having a level at which the note is allowed to be used as a banknote dispensed from an ATM. The teller fit note refers to a fit note having a level at which the note is not allowed to be used as a banknote dispensed from an ATM but is allowed to be used as a banknote dispensed at a teller counter of a bank. Furthermore, banknotes can be sorted into two levels of fitness. In this case, the recognition unit 703 sorts fitness of banknotes into two levels, which are levels representing fit notes (FIT) including the ATM fit notes (ATM) and the teller fit notes (TLR), and unfit notes (UNFIT). In the following description, the level of fitness may be referred to as "fitness level".

The recognition unit 703 also reads a serial number of a banknote when recognizing the banknote.

The binding unit 709 binds stacked banknotes. For example, the binding unit 709 generates a tape ring L, and pulls a tape back after banknotes have been sent into the tape ring L, to bind the banknotes with the tape.

As shown in FIG. 13, a touch panel 717 that doubles as an operation unit for inputting information to the counting device 7 and a display for displaying information in the counting device 7 is disposed on the side surface of the housing 712. The touch panel 717 is a human interface portion for the operator who operates the counting device 7.

The counting device 7 includes a controller 7120 based on, for example, a known microcomputer. The hopper unit 702, the recognition unit 703, the binding stacker 704, the non-binding stacker 705, the reject stacker 706, the transport unit 707, the binding unit 709, and the touch panel 717, which are described above, are connected to the controller 7120 such that a signal can be transmitted and received therebetween. A memory unit 7131 for storing various information and a communication unit 7132 for signal input and output with respect to the computer 5 via a wired or wireless communication line are also connected to the controller 7120. Various signals are inputted and outputted between the controller 7120, and each of the memory unit 7131 and the communication unit 7132.

The controller 7120 generates a control signal based on, for example, an input signal from the touch panel 717 and detection signals from various sensors, and outputs the control signal to the hopper unit 702 and the like. The hopper unit 702 and the like operate according to the control signal from the controller 7120. The controller 7120 configures a handling unit for performing various handling processes including a batch process in the counting device 7.

The storage cassette 31 for storing banknotes to be counted may be connected to the counting device 7, which is not shown. In this case, the storage cassette 31 connected to the counting device 7 feeds out the stored banknotes one by one, and the fed banknotes are taken into the housing 712 of the counting device 7.

(Basic Operation of Banknote Handling Device)

The operation of the counting device 7 will be described below. Basically, the recognition unit 703 performs, for example, recognition of banknotes placed on the hopper unit 702, and the banknotes are sorted into and stacked on the first and the second binding stackers 704A, 704B and the first and the second non-binding stackers 705A, 705B according to the recognition result and an operation mode (described below in detail) set by the computer 5, whereby the counting device 7 sorts the banknotes.

Firstly, the operator places banknotes to be handled on the hopper unit 702. Subsequently, the operator operates the touch panel 717 to start taking in the banknotes.

The banknotes placed on the hopper unit 702 are taken into the housing 712. The taken banknotes are transported by the transport unit 707, and pass in the recognition unit 703. The recognition unit 703 obtains information (including at least a denomination, an issue year, new/old information, fitness information, and a serial number) on the passing banknote, and notifies the controller 7120 of the banknote information.

The controller 7120 determines a destination corresponding to the banknote, that is, the first binding stacker 704A, the second binding stacker 704B, the first non-binding stacker 705A, or the second non-binding stacker 705B, according to the information on the banknote and the set operation mode. The transport unit 707 transports the banknote to the first binding stacker 704A, the second binding stacker 704B, the first non-binding stacker 705A, or the second non-binding stacker 705B, according to the determined destination.

In a case where both the first binding stacker 704A and the second binding stacker 704B are in an operation mode for stacking the same kind of banknotes, the banknote is transported to one of the two binding stackers 704. When the number of the banknotes stacked on one of the binding stackers 704 has reached a predetermined number (for example, 100), the succeeding banknotes are transported to the other of the binding stackers 704. The same applies to a case where both the first non-binding stacker 705A and the second non-binding stacker 705B are in an operation mode for stacking the same kind of banknotes. In the case of a rejected banknote, the controller 7120 sets the destination as the reject stacker 706. The rejected banknote includes an undesignated banknote, an abnormal banknote, an abnormally transported banknote, and a counterfeit banknote. The undesignated banknote is a banknote which is determined as a normal banknote and for which none of the first binding stacker 704A, the second binding stacker 704B, the first non-binding stacker 705A, and the second non-binding stacker 705B are designated as the destination. The abnormal banknote is a banknote that cannot be determined as a banknote based on the information obtained by the recognition unit 703. The abnormally transported banknote is a banknote of which information on the banknote cannot be normally obtained due to abnormal transportation such as skewing or chaining. The counterfeit banknote is a banknote determined as being likely to be a counterfeit banknote according to a result of comparison between the information on the banknote and counterfeit banknote information stored in advance.

The counting device 7 can perform a batch process in which a predetermined number (that is, the number that is set as a batch) of banknotes are stacked on the binding stacker 704 or the non-binding stacker 705 while sorting banknotes. In the batch process, when the number of banknotes set as the batch have been stacked on the binding stacker 704 or the non-binding stacker 705, a banknote is prohibited to be stacked anew on the stacker. When the number of banknotes set as the batch have been stacked on the binding stacker 704, the operator takes out the banknotes from the binding stacker 704 via the first take-out opening 747. Furthermore, when the number of banknotes set as the batch have been stacked on the non-binding stacker 705, the operator takes out banknotes from the non-binding stacker 705 via the second take-out opening 753. After the banknotes have been taken out, stacking banknotes anew on the stacker is automatically or manually restarted.

In a case where banknotes stacked on the binding stacker 704 are bound, when the set number of banknotes to be bound have been stacked on the binding stacker 704, the binding unit 709 binds the banknotes with the tape. The bound banknotes are discharged via the discharge unit 711.

(Operation Mode)

The operation mode of the counting device 7 will be described below. The counting device 7 operates in a first to a fourth operation modes described below. The counting device 7 receives setting of the operation mode via the communication line 9 from the computer 5. The counting device 7 sorts banknotes according to the operation mode received from the computer 5.

In the first to the fourth operation modes, the counting device 7 performs the counting process a plurality of times, to sort the banknotes. In the following description, for example, the first counting process by the counting device 7 is referred to as primary counting, and the second counting process by the counting device 7 is referred to as secondary counting.

In the first operation mode, the operator firstly places unsorted banknotes on the hopper unit 702. The counting device 7 takes in the banknotes placed on the hopper unit 702, and stacks the taken banknotes on the non-binding stacker 705 (primary counting). At this time, the counting device 7 obtains banknote information on the banknotes passing in the recognition unit 703. The banknote information includes information, such as denominations of the banknotes, to be used by the counting device 7 for sorting the banknotes.

Next, the operator places, on the hopper unit 702, the banknotes stacked on the non-binding stacker 705 again. The counting device 7 takes in the banknotes stacked on the hopper unit 702. At this time, the counting device 7 specifies a kind of banknote with the largest number based on the kind thereof, among the banknotes placed on the hopper unit 702, with reference to the banknote information obtained in the primary counting. The counting device 7 stacks the specified kind of banknotes among the banknotes taken in from the hopper unit 702 on, for example, the binding stacker 704, and stacks the other kinds of banknotes on the non-binding stacker 705 (secondary counting). Thereafter, the operator places, on the hopper unit 702, the banknotes stacked on the non-binding stacker 705, whereby the counting device 7 performs the same process as the secondary counting. At this time, the counting device 7 specifies a kind of banknote with the largest number based on the kind thereof, among the banknotes taken in from the hopper unit 702, and stacks the specified kind of banknotes on, for example, the binding stacker 704. The operator performs the same operation until the banknotes are sorted based on the kind. That is, in the first operation mode, the counting device 7 sorts the banknotes placed on the hopper unit 702 based on the kind in the order starting from the kind of banknote with the largest number based on the kind thereof.

In the second operation mode, the primary counting as in the first operation mode is performed.

Next, the operator places, on the hopper unit 702, banknotes stacked on the non-binding stacker 705. The counting device 7 takes in the banknotes placed on the hopper unit 702. At this time, the counting device 7 specifies a kind of banknote with the largest number based on the kind thereof and a kind of banknote with the second largest number based on the kind thereof, among the banknotes stacked on the hopper unit 702, with reference to the banknote information obtained in the primary counting. The counting device 7 stacks the specified kind of banknotes with the largest number based on the kind thereof, among the banknotes taken in from the hopper unit 702 on, for example, the binding stacker 704, stacks the specified kind of banknotes with the second largest number based on the kind thereof thereamong on the first non-binding stacker 705A, and stacks the other kinds of banknotes on the second non-binding stacker 705B (secondary counting). Thereafter, the operator places, on the hopper unit 702, the banknotes stacked on the second non-binding stacker 705B, whereby the counting device 7 performs the same process as the secondary counting. The operator performs the same operation until the banknotes are sorted. That is, in the second operation mode, the counting device 7 sorts two kinds of banknotes from among the banknotes placed on the hopper unit 702 in one counting process.

In the primary counting in each of the first operation mode and the second operation mode, the counting device 7 may stack a predetermined kind of banknotes on the binding stacker 704. Thus, the number of times the counting device 7 performs the counting process can be reduced.

The third operation mode and the fourth operation mode are executed by a plurality of the counting devices 7 operating in conjunction with each other. The counting device 7 that firstly performs the counting process is referred to as a first counting device 7, and the counting device 7 that performs the counting process later is referred to as a second counting device 7.

In the third operation mode, the operator places unsorted banknotes on the hopper unit 702 of the first counting device 7. The first counting device 7 takes in the banknotes placed on the hopper unit 702. At this time, the first counting device 7 obtains banknote information on banknotes passing in the recognition unit 703, stacks a predetermined kind of banknotes on, for example, the binding stacker 704, and stacks the other kinds of banknotes on the non-binding stacker 705 (primary counting). The first counting device 7 transmits the obtained banknote information to the second counting device 7.

Next, the operator places the banknotes stacked on the non-binding stacker 705, on the hopper unit 702 of the second counting device 7. The second counting device 7 takes in the banknotes placed on the hopper unit 702. At this time, the second counting device 7 specifies a kind of banknote with the largest number based on the kind thereof among the banknotes placed on the hopper unit 702 with reference to the banknote information received from the first counting device 7. The counting device 7 stacks the specified kind of banknotes among the banknotes taken in from the hopper unit 702 on, for example, the binding stacker 704, and stacks the other kinds of banknotes on the non-binding stacker 705 (secondary counting). Thereafter, the operator places, on the hopper unit 702, the banknotes stacked on the non-binding stacker 705, whereby the counting device 7 performs the same process as the secondary counting. The operator performs the same operation until the banknotes are sorted. That is, in the third operation mode, the first counting device 7 and the second counting device 7 sort the banknotes in the order starting from the kind of banknote with the largest number based on the kind thereof in conjunction with each other.

Each of the plurality of the first counting devices 7 may perform the primary counting, and one second counting device 7 may perform the secondary counting. In this case, the second counting device 7 sorts the banknotes with reference to banknote information received from each of the plurality of the first counting devices 7 in and after the secondary counting. Furthermore, the third operation mode may be executed such that three or more counting devices 7 are used, the other kinds of banknotes stacked in the secondary counting are placed on the hopper unit 702 of a third counting device 7, whereby the counting device 7 performs the same process (third counting) as the secondary counting, and the other kinds of banknotes stacked in the third counting are placed on the hopper unit 702 of a fourth counting device 7, whereby the counting device 7 performs the same process (fourth counting) as the third counting.

Figure 15:
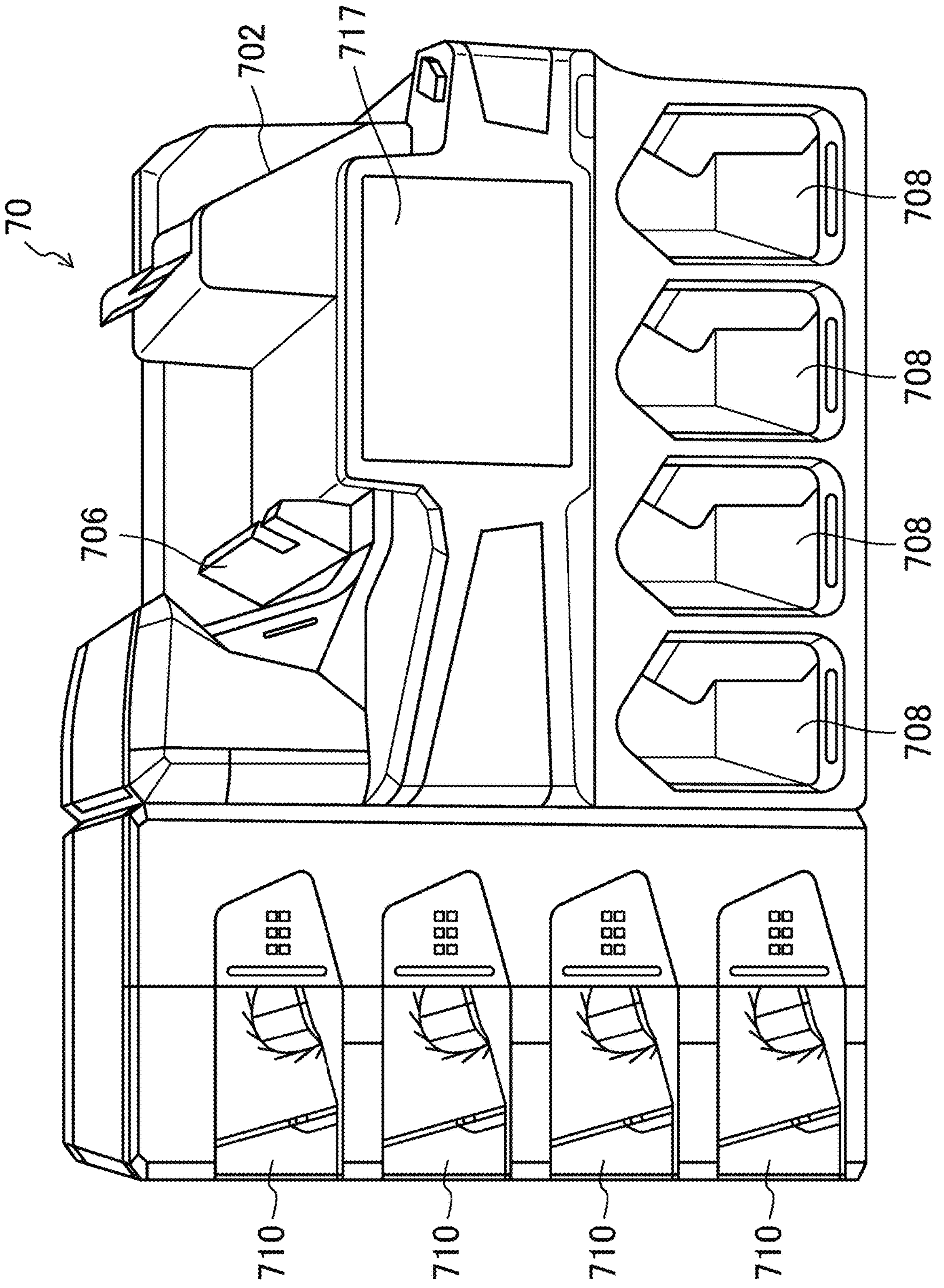
FIG. 15 illustrates an outer appearance of a counting device.

In the fourth operation mode, the second counting device including multiple stackers 708, 710 as illustrated in, for example, FIG. 15, is used. The counting device 70 shown in FIG. 15 is different from the counting device 7 shown in FIG. 13 in that the counting deice 70 does not include the binding unit 709 and the binding stacker 704, and includes the multiple stackers 708, 710. In the counting device 70, the components corresponding to those in the counting device 7 are denoted by the same reference numerals. The counting device 70 further includes a plurality of first stackers 708 and a plurality of second stackers 710. The capacity of the first stacker 708 is greater than the capacity of the second stacker 710. The stacker 708 may be either a binding stacker or a non-binding stacker. The stacker 710 may be either a binding stacker or a non-binding stacker.

Specifically, in the fourth operation mode, the operator places unsorted banknotes on the hopper unit 702 of each of the plurality of first counting devices 7. The plurality of first counting devices 7 each take in the banknotes placed on the hopper unit 702. At this time, each of the first counting devices 7 obtains banknote information on banknotes passing in the recognition unit 703, stacks a predetermined kind of banknotes on the binding stacker 704, and stacks the other kinds of banknotes on the non-binding stacker 705 (primary counting). The plurality of the first counting devices 7 transmit the obtained banknote information to the second counting device 7.

Next, the operator places the banknotes stacked on the non-binding stacker 705 of each of the plurality of first counting devices 7, on the hopper unit 702 of one second counting device 70. The second counting device 70 takes in the banknotes placed on the hopper unit 702. At this time, the second counting device 70 specifies a kind of banknote with the largest number based on the kind thereof, among the banknotes placed on the hopper unit 702 with reference to the banknote information received from each of the plurality of first counting devices 7. The counting device 70 stacks the specified kind of banknotes among the banknotes taken in from the hopper unit 702, on, for example, one or more of the first stackers 708, and stacks the other kinds of banknotes for each kind on others of the first stackers 708 or the second stackers 710 (secondary counting). The second counting device 70 includes the multiple stackers 708, 710. Therefore, in the fourth operation mode, each of the first counting devices 7 and the second counting device 70 can sort banknotes placed on the hopper unit 702 in one counting process.

One first counting device 7 may perform the primary counting and one or more second counting devices 7 may perform the secondary counting. Furthermore, a plurality of the first counting devices 7 may perform the primary counting and a plurality of the second counting devices 7 may perform the secondary counting.

(Operation of Money Collection System)

Next, an operation of the valuable medium handling system 1 will be described. A flow of collecting cash from the stores 1001 into the management center 1002 will be firstly described.

As described above, in the store 1001, the medium handling device 2 for storing banknotes as proceeds from sales (valuable mediums) of the store 1001 is installed. The medium handling device 2 deposits the collected banknotes. Specifically, the staff member of the store 1001 who will perform the depositing sets banknotes in the inlet 211. As described above, the medium handling device 2 stores the banknotes set in the inlet 211 in the first to the fourth storage cassettes 31-1, 31-2, 31-3, 31-4 by the handling unit (excluding rejected banknotes). The medium handling device 2 stores the banknotes for each denomination in the first to the fourth storage cassettes 31-1, 31-2, 31-3, 31-4. Alternatively, the medium handling device 2 may store banknotes for each money reception date in the first to the fourth storage cassettes 31-1, 31-2, 31-3, 31-4. In this case, different denominations of banknotes are stored in each of the storage cassettes 31-1, 31-2, 31-3, 31-4 in a mixed state.

In the store 1001, the medium handling device 2 performs a closing balance process according to an operation performed by the staff member of the store 1001 after, for example, the end of the business of one day. The closing balance process refers to a process for accepting an amount (that is, inventory amount) of banknotes stored in the storage cassettes 31-1, 31-2, 31-3, 31-4 on the day. As described above, the medium handling device 2 stores banknotes in the plurality of storage cassettes 31-1, 31-2, 31-3, 31-4 for each money reception date. For example, banknotes deposited on March 1 are stored in the first storage cassette 31-1, and banknotes deposited on March 2 are stored in the second storage cassette 31-2. Therefore, the closing balance process can also be performed for each storage cassette. The number of the storage cassettes 31 for storing banknotes in the depositing for one day is not limited to one. In a case where an amount of deposited banknotes is large, banknotes for one day may be divided and deposited into two or more storage cassettes 31. Therefore, the number of the storage cassettes 31 for which the closing balance process is to be performed is not limited to one, and the number thereof may be plural. After the closing balance process has been performed, banknotes cannot be stored in the corresponding storage cassette 31. The storage cassette 31 in which banknotes are to be stored on the following day is the storage cassette 31 for which the closing balance process has not been performed.

When the closing balance process has been performed, the medium handling device 2 transmits cassette information via the cassette information communication unit 61 and the interface 3012 to the communication device 3001 mounted in the storage cassette 31. The cassette information includes an inventory amount in the storage cassette 31 and the serial number list of the stored banknotes. The communication device 3001 stores (writes) the received cassette information in the memory unit 3014.

The staff member of the collection agent visits the store 1001 every day or periodically at intervals of predetermined days, or according to a request from the store 1001, and collects banknotes (that is, proceeds from sales) stored in the medium handling device 2. The staff member of the collection agent detaches the storage cassette 31 from the medium handling device 2 installed in the store 1001, and transits the storage cassette 31 to the management center 1002. At this time, the communication device 3001 cannot communicate with the medium handling device 2 via the cassette information communication unit 61 and the interface 3012. In this case, the communication device 3001 determines that the storage cassette has been detached (separated) from the medium handling device 2, and transmits the cassette information stored in the memory unit 3014 to the computer 5 via the communication line 9 by wireless communication (the wireless communication unit 3013). The cassette information includes information such as the serial number of the storage cassette 31, the type and the serial number of the medium handling device 2 to which the storage cassette 31 is attached, and the currency, denominations, series, fitness, and serial number list of the banknotes stored in the storage cassette 31. The computer 5 can obtain the cassette information before the storage cassette 31 reaches the management center 1002.

The staff member of the collection agent may visit a plurality of the stores 1001 one day, to collect banknotes (that is, proceeds from sales) stored in the medium handling devices 2, or may collect a plurality of the storage cassettes 31 from one medium handling device 2.

In the management center 1002, the plurality of counting devices 7, 70 for counting banknotes in the storage cassette 31 are disposed. In the management center 1002, an example of the banknote handling may include predetermining the counting device 7, 70 for performing the counting process for each store 1001. For example, the counting devices 7, 70 are arranged in line, or disposed separately in a plurality of rooms. The line or room for performing the counting process is allocated for each store 1001, and the counting device 7, 70 performs the counting process for the storage cassette 31 of the corresponding store 1001 The computer 5 stores a list in which the serial number of the storage cassette 31, data indicating the store 1001 from which the storage cassette 31 is collected, and data for specifying the counting device 7, 70 that performs the counting process for the store 1001 are associated with each other. The data for specifying the counting device 7, 70 may be allocated for each of the counting devices 7, 70, or for each place (for example, a line number, a room number, or a desk number) at which the counting device 7, 70 is installed. The computer 5 determines the counting device 7, 70 for performing the counting process for the collected storage cassette 31 with reference to the previously obtained cassette information and the list, and notifies the staff member of the collection agent of the counting device 7, 70. For example, the computer 5 lights up a display (the touch panel 717) of the counting device 7, 70 for performing the counting process, thereby notifying the staff member of the collection agent of the determined counting device 7, 70.

The banknote handling at the management center 1002 may not be performed in a method in which the counting device 7, 70 for performing the counting process is predetermined for each store 1001 as described above. In this case, the collected banknotes are handled by any of the counting devices 7, 70. Specifically, the computer 5 obtains the cassette information of the storage cassette 31 in which the collected banknotes have been stored, before the collected banknotes are handled by any of the counting devices. The cassette information includes the serial number of the storage cassette 31 and data indicating the store 1001 from which the storage cassette 31 is collected. The serial number list indicating a result of the counting process by the counting device 7, 70 in the management center 1002, and the serial number of the storage cassette 31 in which the counted banknotes have been stored, are stored so as be associated with each other in the computer 5. Thus, the computer 5 can specify a store from which the banknotes counted in the management center 1002 have come, based on the serial number of the cassette and the serial number list.

Furthermore, the computer 5 sets an operation mode of the counting device 7, 70, based on the cassette information (information such as the currency, denominations, series, fitness, and serial number list of the banknotes stored in the storage cassette 31 in the description herein) received through the communication device 3001. For example, the computer 5 determines, based on the received cassette information, an operation mode for the counting device 7, 70 among the first to the fourth operation modes described above so as to, for example, minimize the number of times the counting process is performed, and transmits a signal indicating the operation mode via the communication line 9 to the counting device 7, 70. The counting device 7, 70 sets, in itself, the operation mode included in the received signal. The computer 5 may determine the operation mode for the counting device 7, 70 according to another rule.

Furthermore, the computer 5 may set an operation mode other than the first to the fourth operation modes described above, in the counting device 7, 70, based on the received cassette information.

In the above-described first to fourth operation modes, the computer 5 determines setting for stacking banknotes on a stacking unit (stacker), by using the counting result in the primary counting performed by the counting device 7, 70, and the counting device 7, 70 performs the counting process based on the setting. Meanwhile, in the operation mode (other than the above-described first to fourth operation modes) based on the received cassette information, the counting device 7, 70 does not perform the primary counting, and the computer 5 obtains the cassette information and generates setting for stacking banknotes on a stacking unit (stacker) based on the cassette information, and the counting device 7, 70 performs the counting process based on the generated setting. Specifically, in the operation mode based on the received cassette information, the computer 5 generates an operation mode in which the number of times the counting process is performed is minimized, based on the received cassette information (for example, denomination information of the banknote), and sets the generated operation mode in the counting device 7, 70. For example, the computer 5 may generate the operation mode for the counting device 7 so as to stack, on the binding stacker 704, the kind of banknotes with the largest number based on the kind thereof, among the banknotes stored in the storage cassette 31, and stack the other kinds of banknotes on the non-binding stacker 705. That is, the computer 5 generates an operation mode in which a destination stacker of banknotes is set so as to minimize the number of times the counting process is performed. Thus, efficiency of handling by the counting device 7 can be enhanced. The computer 5 can switch, by changing the setting, between the counting process in the above-described first to fourth modes and the counting process in the operation mode (other than the first to the fourth operation modes) based on the received cassette information. Thus, a manner for the banknote handling at the management center 1002 can be flexibly changed as appropriate without, for example, changing a position at which the counting device 7, 70 is installed.

The staff member of the collection agent places the banknotes stored in the storage cassette 31 on the hopper unit 702 of the counting device 7, 70 indicated by the computer 5. The counting device 7, 70 sorts the banknotes in the set operation mode. Thus, the banknotes collected by using the storage cassette 31 are sorted. The sorted banknotes are stored in a safe or the like of the management center 1002. In a case where the storage cassette 31 can be attached to the counting device 7, 70, the staff member of the collection agent attaches the storage cassette 31 to the counting device 7, 70 indicated by the computer 5.

Next, a flow of replenishing cash for the store 1001 from the management center 1002 will be described. The management center 1002 may perform preparation of cash used in the store 1001 as a part of the task.

In the management center 1002, the staff member of the collection agent stores banknotes in an empty storage cassette 31. Specifically, the computer 5 notifies the staff member of the collection agent that banknotes are to be stored in an empty storage cassette 31. The staff member of the collection agent stores banknotes in the storage cassette 31 according to the notification from the computer 5. At this time, the computer 5 designates banknotes to be stored in the storage cassette 31. For example, serial numbers of banknotes stored in the safe and storage positions of the banknotes in the safe are stored so as to be associated with each other in the computer 5. The computer 5 notifies the staff member of the collection agent that banknotes disposed at the storage positions are to be stored in the storage cassette 31. For example, the computer 5 displays the banknotes to be stored, and information indicating the storage cassette 31 in which the banknotes are to be stored, on, for example, a display (not shown) connected to the computer 5. The counting device 7, 70 may count banknotes before the banknotes are stored in the empty storage cassette 31.

The computer 5 transmits the cassette information via the communication line 9 to the communication device 3001 disposed in the storage cassette 31. The cassette information includes an inventory amount in the storage cassette 31 and the serial number list. The communication device 3001 stores (writes) the received cassette information in the memory unit 3014.

In a case where a small bundle of banknotes in which 100 banknotes are bound and a large bundle of banknotes in which 10 small bundles of banknotes are bound are stored in the safe, the computer 5 assigns identification information for each of the small bundles of banknotes and the large bundles of banknotes. The corresponding serial number lists of the small bundles of banknotes and the large bundles of banknotes are stored, for each identification information, so as to be associated with each other in the computer 5. The computer 5 may read the serial number list corresponding to the banknotes (the small bundles of banknotes and the large bundles of banknotes) stored by the staff member of the collection agent, and may transmit the cassette information including the read serial number list to the communication device 3001.

Banknotes may be stored in the storage cassette 31 by using a loading device (robot) disclosed in, for example, Japanese Laid-Open Patent Publication No. 2019-28730. In a case where the loading device (robot) is used, the computer 5 is connected to the loading device via the communication line 9 so as to communicate with the loading device. In a case where banknotes are loaded in the storage cassette 31 by the loading device, information on the banknotes loaded in the storage cassette 31 is transmitted from the computer 5 to the wireless communication unit 3013 of the storage cassette 31. Thus, matching of the serial number list stored in the memory unit 3014 and the order in which the banknotes are stored in the storage cassette 31 can be more accurately performed.

The staff member of the collection agent transits the storage cassette 31 in which banknotes are stored, from the management center 1002 to the store 1001. At this time, the storage cassette 31 is separated from the counting device 7, 70 over a predetermined or longer distance. In this case, the communication device 3001 transmits the cassette information to the medium handling device 2 to which the storage cassette 31 is to be attached via the wireless communication unit 3013 and the communication line 9. The cassette information includes an inventory amount in the storage cassette 31 and the serial number list. The medium handling device 2 can obtain the cassette information before the storage cassette 31 reaches the store 1001.

The staff member of the collection agent attaches the storage cassette 31 in which the banknotes are stored, to the medium handling device 2 installed in the store 1001. When the storage cassette 31 is attached to the medium handling device 2, the medium handling device 2 has obtained the serial number list or the like of the banknotes (that is, cash with which the medium handling device 2 is replenished) stored in the attached storage cassette 31. Thus, after the storage cassette 31 has been attached to the medium handling device 2, the inventory amount in the storage cassette 31 can be accepted without performing reconciliation for the storage cassette 31. Therefore, the banknote handling or the like using the serial number list or the like can be quickly performed. In a case where abnormality occurs while banknotes are transported from the storage cassette 31 or banknotes are transported to the storage cassette 31, the medium handling device 2 may perform the partial reconciliation process based on the serial number list in the received cassette information. Thus, the inventory amount in the storage cassette 31 can be accepted in a short time.

When the storage cassette 31 has been attached, the medium handling device 2 may perform reconciliation to accept the inventory amount in the storage cassette 31. The medium handling device 2 may perform the above-described partial reconciliation process based on the serial number list included in the cassette information received through the communication device 3001, to accept the inventory amount in the storage cassette 31. Thus, the staff member of the collection agent can perform the replenishing operation in a shorter time. As described below, the storage cassette 31 is monitored while the storage cassette 31 is transited, whereby it can be ensured that no banknotes have been inserted in and taken out from the storage cassette 31 being transited, so that the inventory amount in the storage cassette 31 can be accepted.

As compared with the above-described process, in a conventional replenishment process, for example, banknotes to be replenished are set in the depositing unit 21, and the recognition unit 25 recognizes the banknotes one by one and counts the banknotes, and, thereafter, the banknotes are stored in a corresponding storage cassette. Therefore, the larger the number of banknotes to be replenished is, the longer a time required for the replenishment is. In the above-described configuration, the inventory amount in the storage cassette 31 can be accepted and the replenishment can be ended without feeding out banknotes from the storage cassette 31 in which the banknotes to be replenished are stored. Therefore, the staff member of the collection agent can perform the replenishment operation in a significantly shortened time. Furthermore, in the above-described configuration, the inventory amount in the storage cassette 31 can be accepted without feeding out banknotes from the storage cassette 31, so that banknotes (mediums) can be strictly managed. In the above-described configuration, the storage cassette 31 in which banknotes to be replenished are stored is attached to the medium handling device 2, whereby the replenishment can be performed.

Furthermore, the medium handling device 2 can continuously use the serial number list transmitted by the communication device 3001 of the storage cassette 31, also in the subsequent processes. The medium handling device 2 need not read the serial numbers of all the banknotes and generate the serial number list again in order to manage banknotes in the storage cassette 31. The medium handling device 2 may perform the overall reconciliation process to accept the inventory amount in the storage cassette 31 and generate the serial number list, after the storage cassette 31 has been attached.

(Process of Computer in Management Center)

Figure 16:
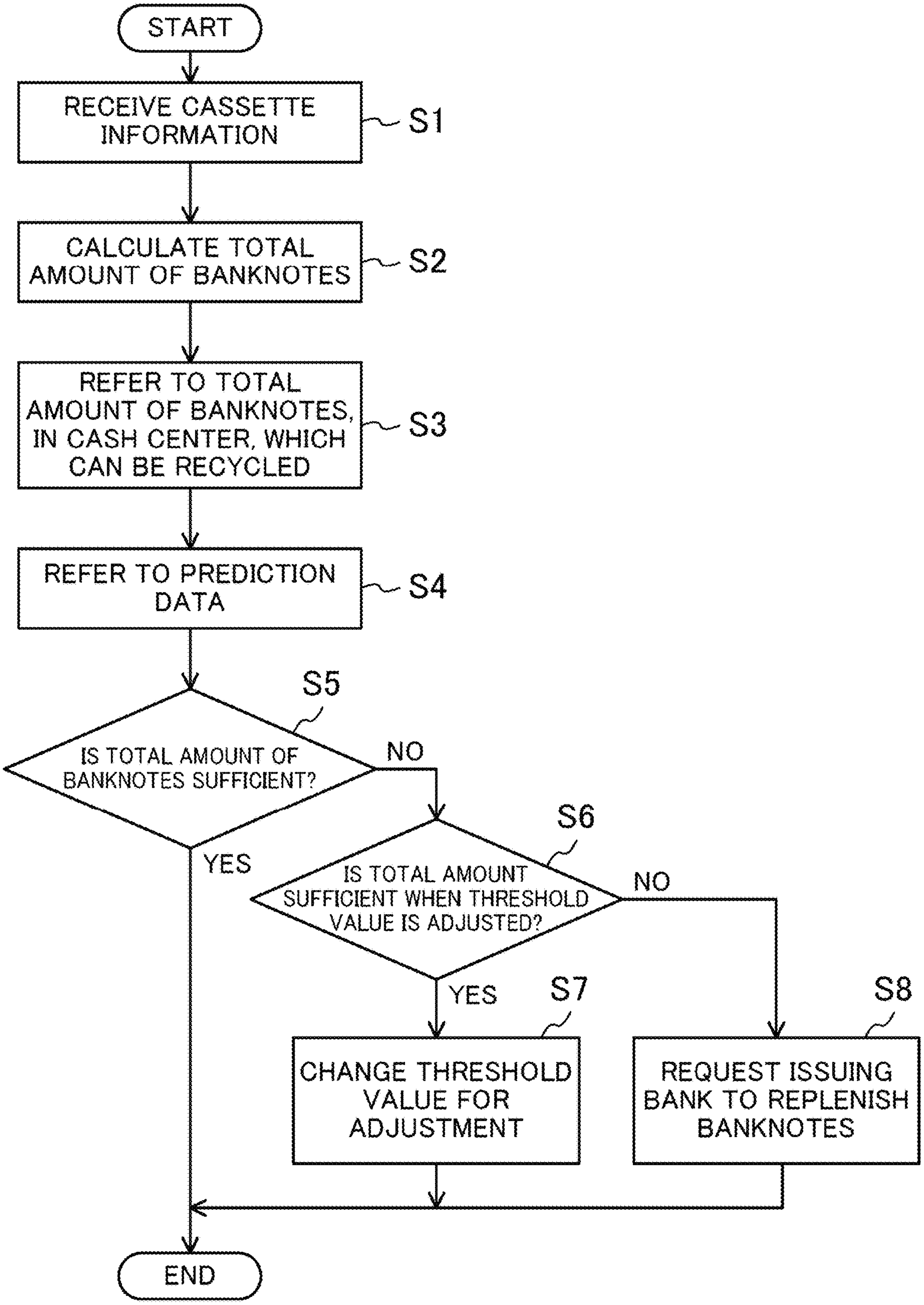
FIG. 16 is a flow chart showing a process for replenishing cash from an issuing bank, at a computer in a management center.

FIG. 16 shows a control flow performed by the computer 5 for replenishing cash from the issuing bank 1003.

The management center 1002 collects banknotes from the stores 1001 and supplies banknotes to the stores 1001. In a case where banknotes to be supplied to the store 1001 are insufficient, specifically, fit notes or new series notes are insufficient, a manager of the management center 1002 may not smoothly perform the task at the management center 1002. Therefore, the management center 1002 requests the issuing bank 1003 to replenish cash. In this example, the computer 5 installed in the management center 1002 requests, via the communication line 9, the computer 6 installed in the issuing bank 1003 to replenish cash. In this example, in the management center 1002, replenishment of cash can be requested before the counting is performed (while the storage cassette 31 is collected from the store 1001).

Firstly, after the process starts, in step S1, the computer 5 receives cassette information through the communication device 3001 of each storage cassette 31. In a case where, for example, the storage cassette 31 is detached from the medium handling device 2, the communication device 3001 transmits the cassette information via the communication line 9. The cassette information includes, for example, details of currency, denominations, and fitness, and the serial number list of banknotes stored in the storage cassette 31. The cassette information is information which is generated by the medium handling device 2, and is stored in the memory unit 3014 of the communication device 3001.

In step S2, the computer 5 calculates a total amount of banknotes (in other words, banknotes collected by the collection agent) collected from the store 1001 into the management center 1002, based on the cassette information received in step S1 and other cassette information received before step S1. The computer 5 calculates the total amount of banknotes for each of kinds of banknotes. In the following steps, the total amount of banknotes is, for example, calculated for each of the kinds of the banknotes.

In step S3, the computer 5 refers to the total amount of banknotes which can be recycled and stored in the safe or the like in the management center 1002. In the description herein, the banknote which can be recycled refers to a banknote which has a fitness level higher than a threshold value and can be used as a fit note. The banknotes which can be recycled may include banknotes which do not correspond to old series notes.

In step S4, the computer 5 refers to prediction data in which the total amount of banknotes to be used in the valuable medium handling system 1 is predicted. The total amount of banknotes in the prediction data includes, for example, the total amount of banknotes to be stored in each storage cassette 31 and the total amount of banknotes required by each store 1001 for replenishment. The prediction data is generated by predicting the total amount of banknotes used in the valuable medium handling system 1 a few days later or one week later. The valuable medium handling system 1 has a program for predicting the total amount of banknotes necessary after a predetermined date (predetermined time) has passed, based on, for example, the total amount of banknotes in the safe of the management center 1002, the total amount of banknotes stored in each storage cassette 31, and denominations of the banknotes. The program is adopted as appropriate according to the usage.

In step S5, the computer 5 determines whether or not the total amount of the banknotes is sufficient. Specifically, the computer 5 compares the total amount of banknotes obtained by adding the total amount of banknotes calculated based on the cassette information and the total amount of banknotes which can be recycled and are stored in the safe or the like in the management center 1002, with the total amount of banknotes included in the prediction data. In a case where the added total amount of banknotes is greater than the total amount of banknotes included in the prediction data, the computer 5 ends the process (Yes in step S5). In other words, the computer 5 does not request the computer 6 to replenish cash. Meanwhile, in a case where the added total amount of banknotes is less than the total amount of banknotes included in the prediction data, the computer 5 proceeds to step S6.

In step S6, the computer 5 determines whether or not the added total amount of banknotes becomes greater than the total amount of banknotes included in the prediction data by changing a threshold value of fitness. Specifically, the computer 5 lowers the threshold value of fitness used for counting by the counting device 7, 70. Thus, after that, in a case where the counting device 7, 70 counts banknotes in the collected storage cassette 31, the total amount of banknotes determined as fit notes is increased. In a case where the threshold value of fitness is lowered to a predetermined threshold value, when the added total amount of banknotes is greater than the total amount of banknotes included in the prediction data (Yes in step S6), the computer 5 changes the threshold value used for determining fitness in the management center 1002 (step S7). In a case where the threshold value of fitness is lowered to the predetermined threshold value, when the added total amount of banknotes is less than the total amount of banknotes included in the prediction data (No in step S6), the computer 5 proceeds to step S8.

In step S8, the computer 5 requests the computer 6 of the issuing bank 1003 to replenish banknotes. Specifically, the computer 5 makes a request to the computer 6 such that the issuing bank 1003 replenishes insufficient banknotes calculated by comparing the added total amount of banknotes with the total amount of banknotes included in the prediction data for each denomination. The request for requesting the issuing bank 1003 to replenish banknotes may be made to the issuing bank 1003 by the staff member of the management center 1002. Steps S6 and S7 may be skipped in the process flow. That is, the process flow may be such that the computer 5 proceeds to step S8 in a case where determination in step S5 is No.

The valuable medium handling system 1 includes the communication device 3001 disposed at the storage cassette 31 which is detachably attached to the medium handling device 2 and which stores banknotes, and includes the controller 513 and the computer 5 that communicate with the communication device 3001 via the communication line 9. The controller 513 and the computer 5 each perform a predetermined process by communicating with the communication device 3001 via the communication line 9. Thus, the controller 513 and the computer 5 can communicate with the storage cassette 31 via the communication line 9, thereby enhancing operability of the valuable medium handling system.

The communication device 3001 transmits the cassette information related to the storage cassette 31 via the communication line 9, and the controller 513 and the computer 5 each receive the cassette information and perform a predetermined process based on the cassette information. Thus, the controller 513 and the computer 5 can receive the cassette information from the storage cassette 31, thereby enhancing operability of the valuable medium handling system.

The storage cassette 31 stores banknotes used in the medium handling device 2 and the counting device 7. The communication device 3001 transmits the cassette information, at least in a state where the storage cassette 31 is detached (separated) from the medium handling device 2 and the counting device 7. Thus, the controller 513 and the computer 5 can receive the cassette information when, for example, the storage cassette is transited by the collection agent or the like.

The storage cassette 31 has the memory unit 3014 for storing the cassette information on stored banknotes. The communication device 3001 transmits the cassette information stored in the memory unit 3014. The controller 513 receives the cassette information transmitted by the communication device 3001, and causes the medium handling device 2 to perform reconciliation for the storage cassette 31 attached to the medium handling device 2 based on the received cassette information. Thus, a time required for the medium handling device 2 to perform the reconciliation can be made shorter, thereby shortening an operation time for the collection agent or the like.

The storage cassette 31 stores banknotes collected from the medium handling device 2 and has the memory unit 3014 for storing the cassette information on the stored banknotes. The communication device 3001 transmits the cassette information stored in the memory unit 3014. The computer 5 receives the cassette information transmitted by the communication device 3001 and performs a process for the banknotes stored in the storage cassette 31 based on the received cassette information. Thus, the computer 5 can perform the process for the banknotes stored in the storage cassette 31.

The storage cassette 31 stores banknotes used in the medium handling device 2 and the counting device 7. The counting device 7 counts the banknotes stored in the storage cassette 31. The computer 5 receives the cassette information transmitted by the communication device 3001 and determines (sets) an operation mode for the counting device 7 which performs the counting process, based on the received cassette information. Thus, the computer 5 can set an appropriate operation mode in the counting device 7 according to the banknotes stored in the storage cassette 31.

The storage cassette 31 stores banknotes used in the medium handling device 2 and the counting device 7. The counting device 7 counts banknotes stored in the storage cassette 31. The computer 5 receives the cassette information transmitted by the communication device 3001 and determines the counting device 7 for performing the counting process among a plurality of the counting devices 7, based on the received cassette information. Thus, the computer 5 can determine the counting device 7 for performing the counting process for the storage cassette 31.

The computer 5 manages banknotes with which the medium handling device 2 is to be replenished based on the received cassette information. Thus, the computer 5 can manage banknotes with which the medium handling device 2 is to be replenished.

The storage cassette 31 stores banknotes with which the medium handling device 2 is to be replenished. The computer 5 transmits the cassette information on the banknotes stored in the storage cassette 31 to the communication device 3001. The storage cassette 31 has the memory unit 3014 for storing the cassette information received by the communication device 3001. Thus, information on the banknotes stored in the storage cassette 31 can be stored in the memory unit 3014 of the storage cassette 31. Therefore, the medium handling device 2 and the computer 5 can obtain information on valuable mediums stored in the storage cassette 31 via the communication line 9.

Each storage cassette 31 (communication device 3001) has a battery for supplying power to the wireless communication unit 3013. Thus, each wireless communication unit 3013 can communicate with the computer 5 and the controller 513 of the medium handling device 2 even in a state where the cassette is detached from the medium handling device 2.

The medium handling device 2 and the counting device 7 each perform a predetermined process by communicating with the communication device 3001 of the storage cassette 31 being transited by the car 1004 for transit. Thus, the medium handling device 2 and the counting device 7 can communicate with the communication device 3001 of the storage cassette 31 being transited by the car 1004 for transit.

The medium handling device 2 and the counting device 7 communicate with the communication unit by a Sigfox, LoRaWAN, ELTRES, ZETA, IM920, LTE-M, Cat.NB1 or NB-IoT communication method as the LPWA standard. Thus, the medium handling device 2 and the counting device 7 can communicate with the communication device 3001 in compliance with a communication standard that allows reduction of power consumption and long distance communication.

(Modification of Valuable Medium Handling System)

Figure 17:
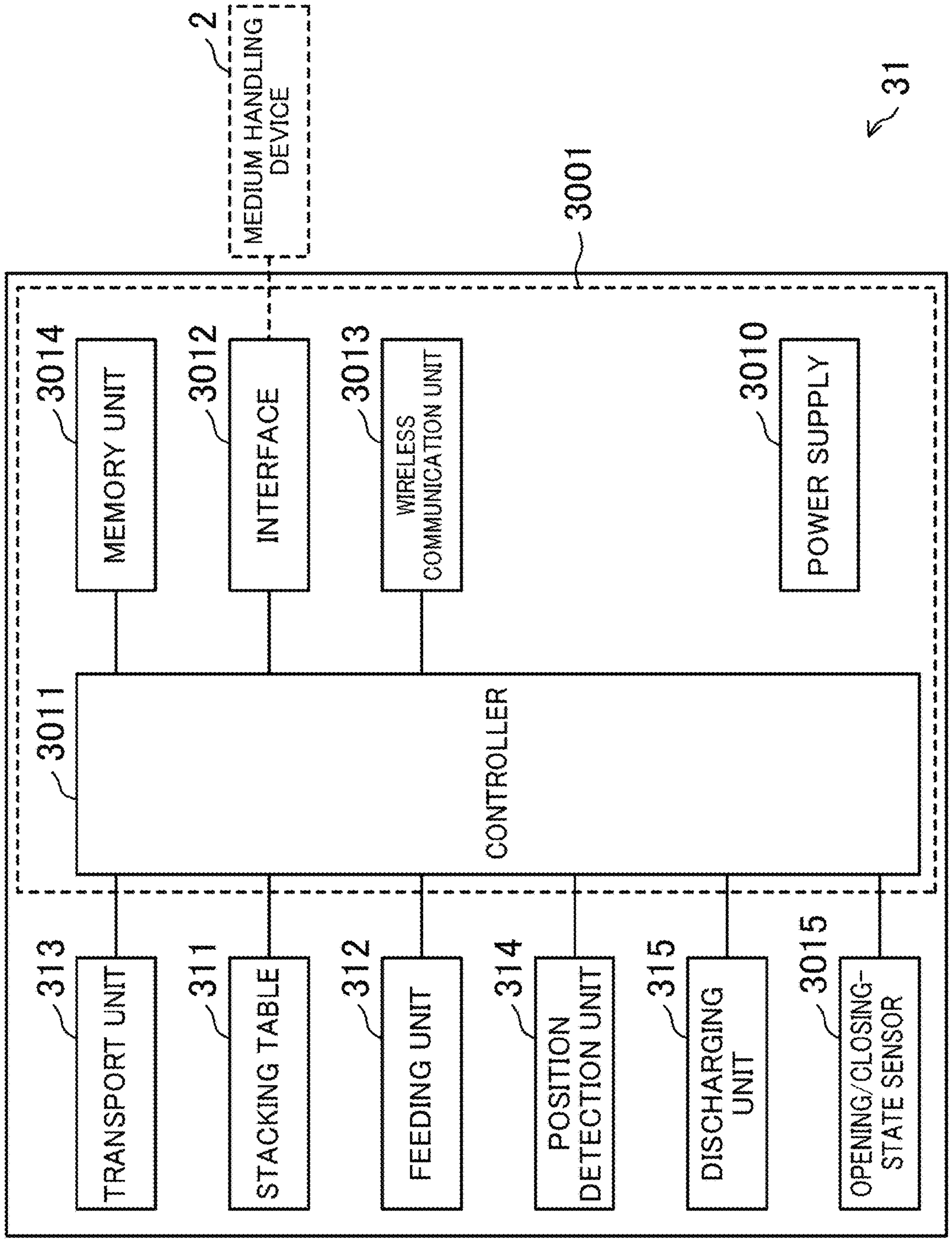
FIG. 17 illustrates another configuration for operation control of the storage cassette.

FIG. 17 illustrates a configuration for operation control of a storage cassette 31 (or a collection cassette 53) having a configuration different from that in FIG. 7. The storage cassette 31 according to the modification includes a position detection unit 314 and a discharging unit 315 which are not shown in FIG. 6 or the like. The position detection unit 314 and the discharging unit 315 are connected to the controller 3011. In FIG. 17, the communication device 3001 includes the controller 3011, the interface 3012, the wireless communication unit 3013, the memory unit 3014, and the power supply 3010. However, the communication device 3001 may include the position detection unit 314.

The position detection unit 314 is implemented by, for example, an antenna for GPS or the like, and outputs positional information indicating a position of the storage cassette 31 to the controller 3011 based on the received GPS signal.

The discharging unit 315 discharges special ink called dye ink in the storage cassette 31. The discharging unit 315 discharges the dye ink onto a banknote stored in the storage cassette 31 according to a signal from the controller 3011.

The memory unit 3014 stores first maintenance information indicating a worn state, an inspection time, and the like for each of units of the storage cassette 31 including, for example, the opening/closing-state sensor 3015, and second maintenance information indicating, for example, version information of a program executed by the controller 3011.

The storage cassette 31 that has the above-described configuration and functions can perform the following operations.

The wireless communication unit 3013 of the storage cassette 31 transmits positional information outputted from the position detection unit 314, via the communication line 9, to the computer 5. The computer 5 monitors each storage cassette 31 based on the received positional information. Thus, when the storage cassette 31 is being transited by the collection agent for the management center 1002, the storage cassette 31 can be monitored. The computer 5 may monitor the storage cassette 31 by generating tracking information (history of positional information) of the storage cassette 31 based on the received positional information.

In this case, a display such as a display unit may be connected to the computer 5 such that the positional information of the storage cassette 31, and opening/closing state information indicating the opening/closing state of the opening/closing door 133 may be displayed on the display. Thus, the staff member of the collection agent is allowed to monitor the storage cassette 31 by checking the display.

The computer 5 transmits an instruction for discharging the dye ink via the communication line 9 to the communication device 3001 of the storage cassette 31 according to an operation by the operator. The communication device 3001 operates to cause the discharging unit 315 to discharge the dye ink onto the banknotes stored in the storage cassette 31 according to the received instruction for discharging the dye ink. Thus, the operator of the computer 5 can remotely operate the discharging unit 315. Therefore, in a case where the storage cassette 31 being transited is stolen, use of the banknotes stored in the stolen storage cassette 31 can be prevented. In a case where a route in which the storage cassette 31 is transited is preset, when the computer 5 determines that the position of the storage cassette 31 is outside the transit route with reference to the route in which the storage cassette 31 is to be transited, the computer 5 may transmit an instruction for discharging dye ink, via the communication line 9, to the communication device 3001 of the storage cassette 31. Alternatively, the computer 5 may transmit an instruction for discharging the dye ink, to the communication device 3001 of the storage cassette 31, when the position of the storage cassette 31 is outside a predetermined route or a predetermined area.

In a case where the first maintenance information and the positional information are received, the computer 5 may specify the storage cassette 31 for which the inspection is required, based on the first maintenance information, and notify the staff member of the collection agent of the positional information of the storage cassette 31. Thus, management of the storage cassette 31 can be facilitated.

In a case where the computer 5 receives the second maintenance information, the computer 5 may transmit an update program to the communication device 3001 of each storage cassette 31, to update the program stored in the memory unit 3014 based on the update program received through the communication device 3001. Thus, the storage cassettes 31 need not be collected in order to update the programs stored in the memory units 3014, thereby facilitating management of the storage cassettes 31.

In the above-described embodiments, banknotes are described as an example of valuable mediums. However, other valuable mediums (for example, coins, checks) can be handled.

The storage cassette is described as the storage unit. However, the storage unit may be a pouch in which valuable mediums are stored, or a container or the like for transiting valuable mediums.

The above-described various embodiments can be combined as appropriate.

What is claimed is:

1. A valuable medium handling system comprising:
communication circuitry disposed in a storage unit that is detachably attached to a first medium handling device and that stores valuable mediums; and
a controller configured to communicate with the communication circuitry via a communication network, wherein
the communication circuitry includes first communication circuitry disposed at a first storage unit of the storage unit and second communication circuitry disposed at a second storage unit of the storage unit,
the storage unit has a memory for storing valuable medium information related to the valuable mediums stored in the storage unit,
the communication circuitry transmits storage unit information related to the storage unit to the controller, the storage unit information including the valuable medium information, before the storage unit is attached to the first medium handling device,
the controller receives the storage unit information transmitted by the communication circuitry before the storage unit is attached to the first medium handling device,
before the storage unit is attached to the first medium handling device, the controller determines, based on the valuable medium information included in the storage unit information, a process for handling, in the first medium handling device, the valuable mediums stored in the storage unit, and
the controller performs the determined process.

2. The valuable medium handling system according to claim 1, wherein
the controller performs the determined process based on the storage unit information.

3. The valuable medium handling system according to claim 2, wherein the storage unit information further includes at least one of individual identification information of the storage unit, state information related to a state of the storage unit, positional information of the storage unit, and maintenance information related to the storage unit.

4. The valuable medium handling system according to claim 2, wherein
the storage unit stores valuable mediums used in the first medium handling device and a second medium handling device different from the first medium handling device, and
the communication circuitry transmits the storage unit information, at least in a state where the storage unit is separated from the first medium handling device and the second medium handling device.

5. The valuable medium handling system according to claim 2, wherein
the controller controls at least the first medium handling device, and
the controller receives the valuable medium information transmitted by the communication circuitry, the controller causing the first medium handling device to perform reconciliation for the storage unit attached to the first medium handling device based on the received valuable medium information.

6. The valuable medium handling system according to claim 2, wherein the storage unit stores valuable mediums collected from the first medium handling device, and has a memory for storing valuable medium information related to the stored valuable mediums, the communication circuitry transmits the valuable medium information stored in the memory, and the controller receives the valuable medium information transmitted by the communication circuitry, the controller handling the valuable mediums stored in the storage unit based on the received valuable medium information.

7. The valuable medium handling system according to claim 6, wherein the storage unit stores valuable mediums used in the first medium handling device and a second medium handling device different from the first medium handling device, the second medium handling device counts valuable mediums stored in the storage unit, and the controller receives the valuable medium information transmitted by the communication circuitry, the controller determining an operation mode in which the second medium handling device counts the valuable mediums based on the received valuable medium information.

8. The valuable medium handling system according to claim 6, wherein the storage unit stores valuable mediums used in the first medium handling device and a second medium handling device different from the first medium handling device, the second medium handling device counts valuable mediums stored in the storage unit, the second medium handling device includes a plurality of second medium handling devices, and the controller receives the valuable medium information transmitted by the communication circuitry, the controller determining a second medium handling device for counting the valuable mediums, among the plurality of second medium handling devices, based on the received valuable medium information.

9. The valuable medium handling system according to claim 6, wherein the controller manages valuable mediums with which the first medium handling device is replenished, based on the received valuable medium information.

10. The valuable medium handling system according to claim 2, wherein the storage unit is used for transiting valuable mediums, and is detachably attached to the first medium handling device and a second medium handling device different from the first medium handling device, and the communication circuitry transmits the storage unit information in a state where the storage unit is detached from the first medium handling device and the second medium handling device.

11. The valuable medium handling system according to claim 1, wherein the storage unit stores valuable mediums with which the first medium handling device is replenished, the controller transmits valuable medium information related to the valuable mediums stored in the storage unit, to the communication circuitry, and the storage unit has a memory for storing the valuable medium information received by the communication circuitry.

12. The valuable medium handling system according to claim 1, wherein the communication circuitry transmits positional information of the storage unit in a state where the storage unit is detached from the first medium handling device, and the controller monitors the storage unit based on the received positional information.

13. The valuable medium handling system according to claim 12, wherein the storage unit includes a discharging unit for discharging ink toward a valuable medium stored therein, the discharging unit operates based on information received by the communication circuitry, and the controller transmits an instruction for causing the discharging unit to discharge the ink, via the communication network, to the communication circuitry.

14. The valuable medium handling system according to claim 1, wherein the communication circuitry transmits maintenance information for the storage unit, and the controller manages the storage unit based on the received maintenance information.

15. The valuable medium handling system according to claim 14, wherein the communication circuitry transmits the maintenance information in a state where the storage unit is detached from the first medium handling device.

16. The valuable medium handling system according to claim 1, wherein the first storage unit has a battery for supplying power to the first communication circuitry, and the second storage unit has a battery for supplying power to the second communication circuitry.

17. The valuable medium handling system according to claim 1, wherein the controller communicates with the communication circuitry of the storage unit being transited by a car for transit.

18. The valuable medium handling system according to claim 1, wherein the controller communicates with the communication circuitry by a Sigfox, LoRaWAN, ELTRES, ZETA, EVI920, LTE-M, Cat.NB1 or NB-IoT communication method as a LPWA (low-power wide-area) standard.

19. A valuable medium handling method comprising:

performing communication, via a communication network, between a controller and a communication circuitry disposed at a storage unit that is detachably attached to a first medium handling device and that stores valuable mediums;

transmitting, by the communication circuitry, storage unit information related to the storage unit, via the communication network;

transmitting, by the communication circuitry, at least one of positional information of the storage unit and opening/closing-state information of a door of the storage unit, to the controller, in a state where the storage unit is detached from the first medium handling device;

monitoring, by the controller, the storage unit based on at least one of the positional information and the opening/closing-state information having been received;

transmitting, by the communication circuitry, the storage unit information related to the storage unit, before the storage unit is attached to the first medium handling device, the storage unit information including valuable medium information that is related to the valuable mediums stored in the storage unit and is stored in a memory of the storage unit;

receiving, by the controller, the storage unit information transmitted by the communication circuitry, before the storage unit is attached to the first medium handling device;

before the storage unit is attached to the first medium handling device, based on the valuable medium information included in the storage unit information, determining, by the controller, a process for handling, in the first medium handling device, the valuable mediums stored in the storage unit; and performing, by the controller, the determined process.

20. The valuable medium handling method according to claim 19, wherein the controller has a display, and the controller causes the display to display information based on at least one of the positional information and the opening/closing-state information having been received.

* * * * *